(12) United States Patent
Dewa

(10) Patent No.: US 8,645,560 B2
(45) Date of Patent: Feb. 4, 2014

(54) CONTENT PROVIDING SYSTEM AND METHOD, SHARED CONTENT PROVIDING APPARATUS AND METHOD, CONTENT OUTPUT APPARATUS AND METHOD, AND PROGRAM

(75) Inventor: Yoshiharu Dewa, Tokyo (JP)

(73) Assignee: Sony Corporation, Tokyo (JP)

( * ) Notice: Subject to any disclaimer, the term of this patent is extended or adjusted under 35 U.S.C. 154(b) by 304 days.

(21) Appl. No.: 12/528,820

(22) PCT Filed: Feb. 28, 2008

(86) PCT No.: PCT/JP2008/053468
§ 371 (c)(1),
(2), (4) Date: Aug. 27, 2009

(87) PCT Pub. No.: WO2008/105485
PCT Pub. Date: Sep. 4, 2008

(65) Prior Publication Data
US 2010/0106800 A1    Apr. 29, 2010

(30) Foreign Application Priority Data
Feb. 28, 2007  (JP) ................................. 2007-049235

(51) Int. Cl.
*G06F 15/16* (2006.01)
*H04N 5/445* (2011.01)
(52) U.S. Cl.
USPC ............................................ 709/231; 725/46
(58) Field of Classification Search
USPC ............ 709/217–219, 231; 725/74–15, 9–21, 725/46; 705/51–59
See application file for complete search history.

(56) References Cited

U.S. PATENT DOCUMENTS 6,983,478 B1 * 1/2006 Grauch et al. .................. 725/13
7,472,175 B2 * 12/2008 Bartholomew ............... 709/219

(Continued)

FOREIGN PATENT DOCUMENTS

JP    11-355815    12/1999
JP    2003-520458   7/2003

(Continued)

OTHER PUBLICATIONS

Nikkei Electronics, Apr. 23, 2001 (No. 794).

(Continued)

*Primary Examiner* — Shirley Zhang
(74) *Attorney, Agent, or Firm* — Oblon, Spivak, McClelland, Maier & Neustadt, L.L.P.

(57) ABSTRACT

The present invention relates to a content providing system and method, a shared content providing apparatus and method, a content output apparatus and method, and a program for making it possible to provide content to a different user without infringing on copyright. Content items are provided from a content server 21 to a plurality of broadcast receiving apparatuses 14-1 to 14-3 via a broadcasting network 12. A video clip server 16 obtains, from the content server 21, shared content that is content shared by a plurality of users, among the provided content items. The video clip server 16 sends selecting information for selecting the obtained shared content to the plurality of broadcast receiving apparatuses 14-1 to 14-3 via the Internet 11. The shared content selected by the broadcast receiving apparatuses 14-1 to 14-3 on the basis of the selecting information is provided from the video clip server 16 to the broadcast receiving apparatuses 14-1 to 14-3.

22 Claims, 28 Drawing Sheets

(56) References Cited

U.S. PATENT DOCUMENTS

| | | | |
|---|---|---|---|
| 7,689,705 B1 * | 3/2010 | Lester et al. | 709/231 |
| 7,765,603 B2 * | 7/2010 | Tanaka | 726/28 |
| 7,778,927 B2 * | 8/2010 | Kawakami | 705/59 |
| 7,861,256 B2 * | 12/2010 | Kano | 725/9 |
| 7,877,328 B2 * | 1/2011 | Tanaka | 705/57 |
| 7,877,473 B2 * | 1/2011 | Tanaka | 709/224 |
| 7,895,625 B1 * | 2/2011 | Bryan et al. | 725/46 |
| 7,895,636 B2 * | 2/2011 | Ogasawara | 725/141 |
| 2002/0032904 A1 * | 3/2002 | Lerner | 725/14 |
| 2002/0056119 A1 | 5/2002 | Moynihan | |
| 2003/0083954 A1 * | 5/2003 | Namba | 705/26 |
| 2003/0093806 A1 | 5/2003 | Dureau et al. | |
| 2004/0073915 A1 * | 4/2004 | Dureau | 725/9 |
| 2004/0117853 A1 * | 6/2004 | Karaoguz et al. | 725/134 |
| 2004/0199654 A1 | 10/2004 | Juszkiewicz | |
| 2004/0236945 A1 * | 11/2004 | Risan et al. | 713/165 |
| 2005/0055713 A1 * | 3/2005 | Lee et al. | 725/46 |
| 2005/0076093 A1 * | 4/2005 | Michelitsch et al. | 709/217 |
| 2005/0149987 A1 * | 7/2005 | Boccon-Gibod et al. | 725/135 |
| 2006/0008256 A1 | 1/2006 | Khedouri et al. | |
| 2006/0143653 A1 | 6/2006 | Suh | |
| 2006/0174277 A1 * | 8/2006 | Sezan et al. | 725/46 |
| 2006/0184977 A1 * | 8/2006 | Mueller et al. | 725/86 |
| 2006/0221173 A1 | 10/2006 | Duncan | |
| 2006/0282856 A1 * | 12/2006 | Errico et al. | 725/46 |
| 2007/0157252 A1 * | 7/2007 | Perez | 725/61 |
| 2007/0174471 A1 * | 7/2007 | Van Rossum | 709/229 |
| 2007/0186228 A1 * | 8/2007 | Ramaswamy et al. | 725/14 |
| 2008/0028294 A1 * | 1/2008 | Sell et al. | 715/234 |
| 2008/0154633 A1 * | 6/2008 | Ishibashi et al. | 705/1 |
| 2008/0250100 A1 * | 10/2008 | Hatanaka et al. | 709/203 |
| 2009/0151006 A1 * | 6/2009 | Saeki et al. | 726/28 |

FOREIGN PATENT DOCUMENTS

| | | |
|---|---|---|
| JP | 2004-194255 | 7/2004 |
| JP | 2004-364140 | 12/2004 |
| JP | 2005-136974 | 5/2005 |

OTHER PUBLICATIONS

May 6, 2011 Communication from the European Patent Office.

Office Action issued Feb. 21, 2013, in Japanese Patent Application No. 2009-501290.

Japanese Advisory Action issued Dec. 3, 2013, in Patent Application No. 2009-501290.

* cited by examiner

CONTENT PROVIDING SYSTEM AND METHOD, SHARED CONTENT PROVIDING APPARATUS AND METHOD, CONTENT OUTPUT APPARATUS AND METHOD, AND PROGRAM

TECHNICAL FIELD

The present invention relates to a content providing system and method, a shared content providing apparatus and method, a content output apparatus and method, and a program, and more particularly, to a content providing system and method, a shared content providing apparatus and method, a content output apparatus and method, and a program for making it possible to provide content to a different user without infringing on copyright.

BACKGROUND ART

Hitherto, content such as image information and audio information has been provided to individual users mainly through television broadcasting and radio broadcasting. However, the Internet has been widely used nowadays, and content has been provided through the Internet. For example, sites that show content such as images created or recorded by individual users to other users have been operated. On such sites, content that has been freely uploaded by individual users can be viewed by many other users at no cost.

However, content uploaded by individual users to the above-described sites includes content that has been provided without the permission of the copyright holder. Thus, the profits of the copyright holder may be adversely affected.

Therefore, TVanytime (registered trademark), which is an industry organization that promotes standardization of digital television broadcasting technology, has proposed to add a CRID (Content Reference Identification), which is a unique ID, to every broadcast program and every content on the Internet (e.g., see Non-Patent Document 1). By identifying content with the CRID, the content's copyright can be managed.

[Non-Patent Document 1] "Sutoregi Zentei No Jisedai TV 'TV Anytime' No Zenyou Content Wo ID-ka Housou, Internet Wo Kensaku (The Full Scope of 'TV Anytime': the Next Generation TV Assuming Storage--Assigning ID to Content and Searching Broadcasts and Internet)", "Nikkei Electronics Apr. 23, 2001, no. 794 (Apr. 23, 2001), Junichi KISHIGAMI, Nikkei BP, Inc.

DISCLOSURE OF INVENTION

Technical Problem

However, content can be managed using a CRID only when the content is digital data. When content is analog data, it is difficult to manage the content using a CRID.

The present invention has been made in view of the foregoing circumstances and makes it possible to provide content to a different user without infringing on copyright.

Technical Solution

An aspect of the present invention resides in a content providing system including: content providing means for providing content items via a network; content output means for outputting the provided content items; specifying/selecting means for specifying, among the output content items, shared content that is content shared by a plurality of users and selecting the predetermined shared content; and shared content providing means for obtaining the specified content as the shared content from the content providing means and providing the shared content selected on the basis of selecting information for selecting the obtained shared content via the network to the content output means having selected the shared content on the basis of the selecting information.

The content providing means may be constituted by a broadcasting apparatus that broadcasts the content via a broadcasting network serving as the network. The content output means may be constituted by a broadcast receiving apparatus that receives and outputs the broadcast content. The specifying/selecting means may be constituted by a remote controller that remotely operates the broadcast receiving apparatus, the remote controller specifying the content output from the broadcast receiving apparatus at a timing at which a predetermined button is operated as the shared content, and selecting the shared content on the basis of the selecting information displayed on the broadcast receiving apparatus. The shared content providing means may be a server connected to the broadcast receiving apparatus via the Internet serving as the network, and the shared content providing means may obtain specification information for specifying the content as the shared content from the broadcast receiving apparatus via the Internet, obtain the shared content from the broadcasting apparatus on the basis of the specification information, and send the selecting information to a plurality of the broadcast receiving apparatuses via the Internet.

The content providing means may be constituted by a providing apparatus that provides the content via the Internet serving as the network. The content output means may be constituted by an electronic device that accepts the provision of the content and outputs the content. The specifying/selecting means may be constituted by an input unit that inputs a command to the electronic device, the input unit specifying the content output from the electronic device at a timing at which a predetermined button is operated as the shared content, and selecting the shared content on the basis of the selecting information displayed on the electronic device. The shared content providing means may be a server connected to the electronic device via the Internet, and the shared content providing means may obtain specification information for specifying the content as the shared content from the electronic device via the Internet, and obtain the shared content from the providing apparatus on the basis of the specification information.

A content providing method includes a content providing step of providing content items via a network; a content output step of outputting the provided content items; a specifying step of specifying, among the output content items, shared content that is content shared by a plurality of users; a shared content obtaining step of obtaining the content specified in processing of the specifying step as the shared content from an apparatus that provides the content in processing of the content providing step; a selecting step of selecting the predetermined shared content on the basis of selecting information for selecting the obtained shared content; and a shared content providing step of providing the selected shared content via the network to an apparatus having selected the shared content on the basis of the selecting information.

A shared content providing apparatus includes specification information obtaining means for obtaining, from a content output apparatus that accepts provision of content items via a network from a content providing apparatus, specification information for specifying a predetermined item among the content items as shared content that is content shared by a plurality of users via the network; shared content obtaining means for obtaining the shared content specified on the basis of the specification information from the content providing apparatus; and providing means for providing the shared content selected on the basis of selecting information for selecting the obtained shared content to the content output apparatus having selected the shared content on the basis of the selecting information via the network.

Selecting information notification means for sending a notification of the selecting information to the content output apparatus via the network may further be provided.

The network via which the content providing apparatus provides the content items may be a broadcasting network. The content providing apparatus may be a broadcasting apparatus. The network via which the specification information obtaining means obtains the specification information may be the Internet. The content output apparatus may be a broadcast receiving apparatus.

The specification information may be channel information that indicates a channel that broadcasts the content and date-and-time information that indicates date and time at which the content is broadcast.

Counting means for counting the number of times the content has drawn attention and sending means for sending the counted number of times to the content providing apparatus may further be provided.

The counting means may include first counting means for counting the number of times the specification information is received; and second counting means for counting the number of times the shared content is selected on the basis of the selecting information.

The network via which the content providing apparatus provides the content items and the network via which the specification information obtaining means obtains the specification information may be the Internet. The content output apparatus may be an electronic device.

The specification information may be a URL for accessing the content.

A shared content providing method includes a specification information obtaining step of obtaining, from a content output apparatus that accepts provision of content items via a network from a content providing apparatus, specification information for specifying a predetermined item among the content items as shared content that is content shared by a plurality of users via the network; a shared content obtaining step of obtaining the shared content specified on the basis of the specification information from the content providing apparatus; and a providing step of providing the shared content selected on the basis of selecting information for selecting the obtained shared content to the content output apparatus having selected the shared content on the basis of the selecting information via the network.

A program causes a computer to execute a specification information obtaining step of obtaining, from a content output apparatus that accepts provision of content items via a network from a content providing apparatus, specification information for specifying a predetermined item among the content items as shared content that is content shared by a plurality of users via the network; a shared content obtaining step of obtaining the shared content specified on the basis of the specification information from the content providing apparatus; and a providing step of providing the shared content selected on the basis of selecting information for selecting the obtained shared content to the content output apparatus having selected the shared content on the basis of the selecting information via the network.

A content output apparatus includes output means for outputting content items received from a content providing apparatus via a network; detection means for detecting, in a case where a predetermined item among the output content items is specified as shared content that is shared by a plurality of users, specification information for specifying the content; specification information sending means for sending the detected specification information via the network to a shared content providing apparatus; selecting means for selecting the predetermined item among the shared content on the basis of selecting information for selecting the shared content; and shared content obtaining means for obtaining the selected shared content from the shared content providing apparatus via the network.

Selecting information obtaining means for obtaining the selecting information from the shared content providing apparatus via the network may further be provided.

The network via which the output means receives the content items from the content providing apparatus may be a broadcasting network. The content providing apparatus may be a broadcasting apparatus. The network via which the specification information is sent to the shared content providing apparatus may be the Internet. The shared content providing apparatus may be a server. The content output apparatus may be a broadcast receiving apparatus.

The detection means may detect, as the specification information, channel information that indicates a channel that broadcasts the content and date-and-time information that indicates date and time at which the content is broadcast.

The detection means may detect, as the specification information, a URL for accessing the content.

The network via which the content providing apparatus provides the content items and the network via which the specification information sending means sends the specification information may be the Internet. The content output apparatus may be an electronic device.

A content output method includes an output step of outputting content items received from a content providing apparatus via a network; a detection step of detecting, in a case where a predetermined item among the output content items is specified as shared content that is shared by a plurality of users, specification information for specifying the content; a specification information sending step of sending the detected specification information via the network to a shared content providing apparatus; a selecting step of selecting the predetermined item among the shared content on the basis of selecting information for selecting the shared content; and a shared content obtaining step of obtaining the selected shared content from the shared content providing apparatus via the network.

A program causes a computer to execute an output step of outputting content items received from a content providing apparatus via a network; a detection step of detecting, in a case where a predetermined item among the output content items is specified as shared content that is shared by a plurality of users, specification information for specifying the content; a specification information sending step of sending the detected specification information via the network to a shared content providing apparatus; a selecting step of selecting the predetermined item among the shared content on the basis of selecting information for selecting the shared content; and a shared content obtaining step of obtaining the selected shared content from the shared content providing apparatus via the network.

In the first aspect of the present invention, shared content that is content shared by a plurality of users is specified among content items output via a network, and the specified content is obtained as shared content from a content providing apparatus or means. The selected shared content is provided via the network to an apparatus having selected the shared content.

Also, in the second aspect of the present invention, from a content output apparatus that accepts provision of content items from a content providing apparatus via a network, specification information for specifying a predetermined item among the content items as shared content that is content shared by a plurality of users is obtained via the network. The shared content specified on the basis of the specification information is obtained from the content providing apparatus and is provided to the content output apparatus having selected the shared content via the network.

Furthermore, in the third aspect of the present invention, in a case where a predetermined item among content items that are received and output from a content providing apparatus via a network is specified as shared content that is shared by a plurality of users, specification information for specifying the content is detected. The detected specification information is sent to a shared content providing apparatus via the network. When the predetermined item among the shared content is selected on the basis of selecting information, the selected shared content is obtained from the shared content providing apparatus via the network.

Advantageous Effects

As above, according to the aspects of the present invention, content can be provided to a different user without infringing on copyright.

Figure 1:
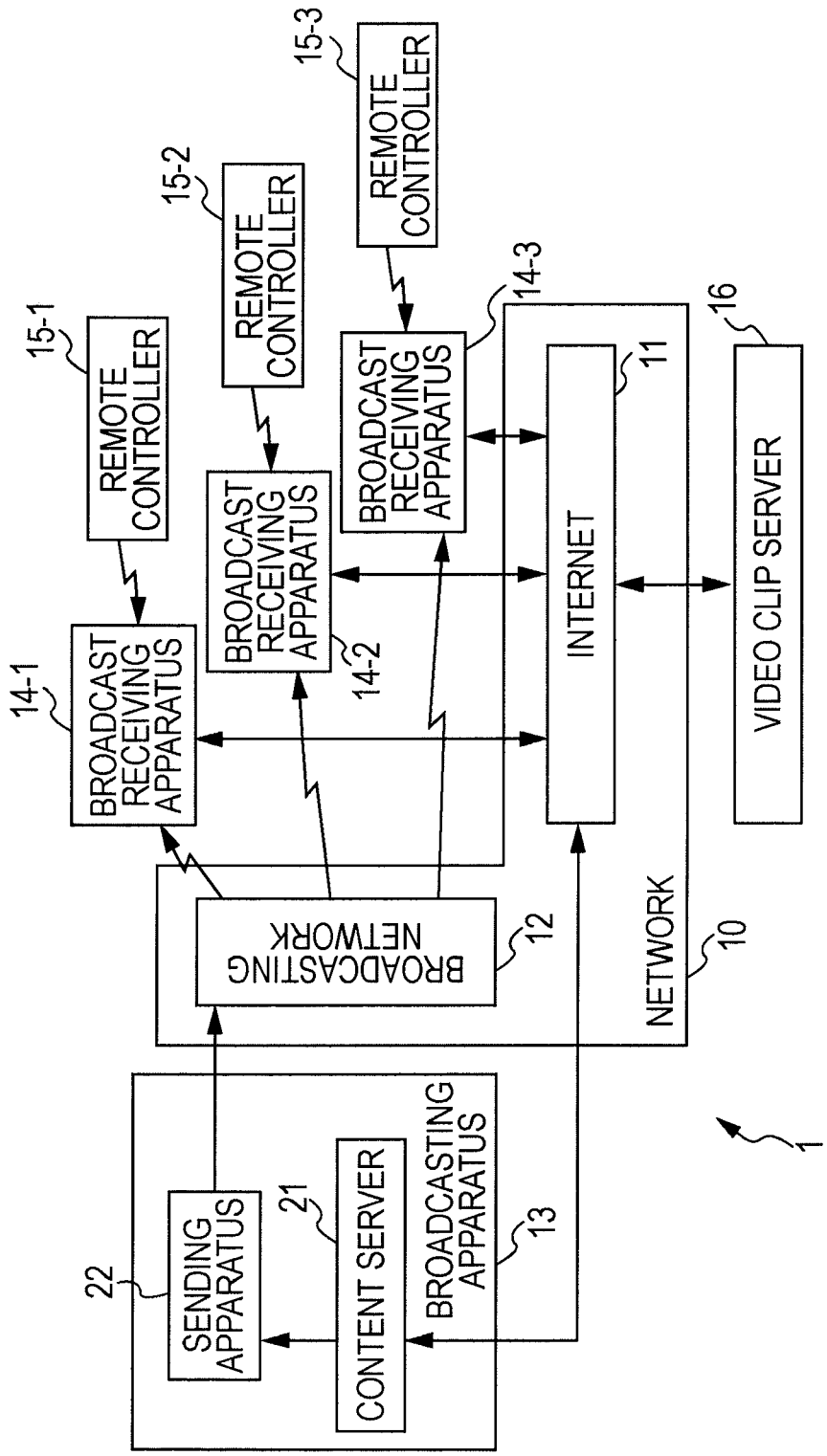
FIG. 1 is a block diagram illustrating a structure of an embodiment of a content providing system to which the present invention is applied.

EXPLANATION OF REFERENCE NUMERALS 1 content providing system, 11 Internet, 12 broadcasting network, 13 broadcasting apparatus, 14-1 to 14-3 broadcast receiving apparatuses, 15-1 to 15-3 remote controllers, 16 video clip server, 16 content server, 22 sending apparatus, 41 broadcast content supplying unit, 42 shared content supplying unit, 43 search unit, 44 storage unit, 45 determination unit, 46 notification unit, 61 specification information obtaining unit, 62 shared content obtaining unit, 63 notification unit, 64 determination unit, 65 providing unit, 65 control unit, 67 number-of-publishing requests counting unit, 68 number-of-distribution-requests counting unit, 70 storage unit, 81 content receiving unit, 82 output unit, 83 detection unit, 84 specification information sending unit, 85 selecting information obtaining unit, 86 control unit, 87 shared content obtaining unit, 88 signal receiving unit, 101 operation unit, 102 detection unit, 103 sending unit, 111 recommendation button, 112 sharing button, 113 play button, 114 pointer keys, 115 numeric keypad

BEST MODES FOR CARRYING OUT THE INVENTION

Hereinafter, embodiments of the present invention will be described with reference to the drawings.

FIG. 1 is a block diagram illustrating a structure of an embodiment of a content providing system to which the present invention is applied. In this content providing system 1, a network 10 is constituted by the Internet 11 and a broadcasting network 12. The content providing system 1 includes a broadcasting apparatus 13 that broadcasts content via the broadcasting network 12, broadcast receiving apparatuses 14-1 to 14-3 that are remotely controlled by remote controllers 15-1 to 15-3 and that receive broadcast content, and a video clip server 16 that is connected via the Internet 11 to the broadcasting apparatus 13 and the broadcast receiving apparatuses 14-1 to 14-3. The broadcast receiving apparatuses 14-1 to 14-3 are constituted by, for example, television receivers. Although only three remote controllers 15-1 to 15-3 and three broadcast receiving apparatuses 14-1 to 14-3 are illustrated, actually there are more remote controllers and broadcast receiving apparatuses. The video clip server 16 is held by a business proprietor different from an Internet service provider that provides services for connecting, for example, the broadcast receiving apparatuses 14-1 to 14-3 to the Internet 11 or is different from another business proprietor that conducts a broadcasting business using the broadcasting apparatus 13.

Note that, when it is unnecessary to distinguish the individual broadcast receiving apparatuses 14-1 to 14-3 and the individual remote controllers 15-1 to 15-3, they will be simply written as broadcast receiving apparatuses 14 or remote controllers 15.

The broadcasting apparatus 13 is constituted by a content server 21 and a sending apparatus 22. The content server 21 stores content to be broadcast. This content is supplied also as shared content to the video clip server 16 connected via the Internet 11 to the content server 21. The sending apparatus 22 reads content stored in the content server 21 and supplies the content via the broadcasting network 12 to the broadcast receiving apparatus 14 of each user. The operation of the broadcast receiving apparatus 14 is remotely controlled by a correlated one of the remote controllers 15.

Note that, although the video clip server 16 is connected to the content server 21 via the Internet 11 in this embodiment, the video clip server 16 may be directly connected to the content server 21. In addition, although content to be broadcast via the broadcasting network 12 and content to be supplied to the video clip server 16 are stored in the same content server 21, they may be stored in different servers.

Figure 2:
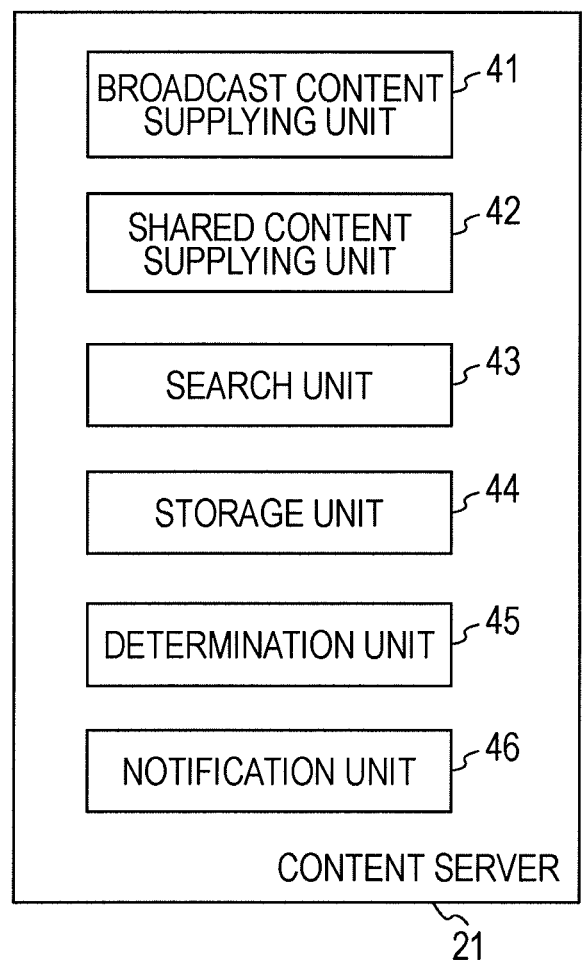
FIG. 2 is a block diagram illustrating a functional structure of an embodiment of a content server.

FIG. 2 illustrates a functional structure of an embodiment of the content server 21. This content server 21 is constituted by a broadcast content supplying unit 41, a shared content supplying unit 42, a search unit 43, a storage unit 44, a determination unit 45, and a notification unit 46.

The broadcast content supplying unit 41 reads content for broadcasting, which is stored in the storage unit 44, and supplies the content to the sending apparatus 22. The shared content supplying unit 42 reads content stored in the storage unit 44 and supplies the content as shared content to the video clip server 16.

The search unit 43 searches for, among content items stored in the storage unit 44, content requested by a user to be downloaded as shared content. The storage unit 44 stores content items to be broadcast. Predetermined items among the content items serve as shared content shared by many users. The determination unit 45 determines, for example, whether or not there is a copyright problem in content distribution. The notification unit 46 sends a notification of refusal of provision of content.

Figure 3:
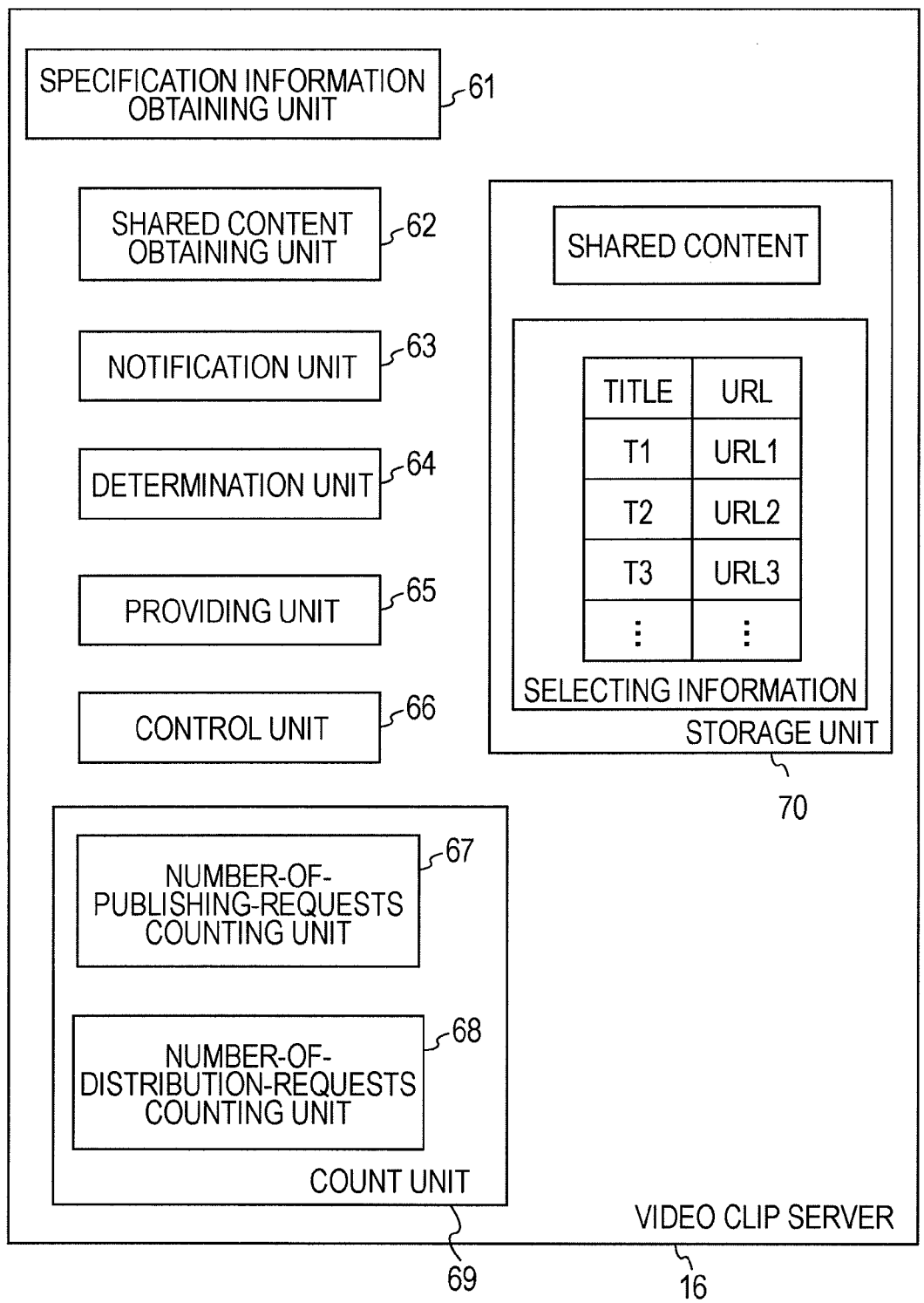
FIG. 3 is a block diagram illustrating a functional structure of an embodiment of a video clip server.

FIG. 3 illustrates a functional structure of an embodiment of the video clip server 16. This video clip server 16 is constituted by a specification information obtaining unit 61, a shared content obtaining unit 62, a notification unit 63, a determination unit 64, a providing unit 65, a control unit 66, a count unit 69 including a number-of-publishing-requests counting unit 67 and a number-of-distribution-requests counting unit 68, and a storage unit 70.

The specification information obtaining unit 61 obtains speciation information for specifying content, which is sent from the broadcast receiving apparatus 14. In the case of this embodiment, specification information is constituted by channel information and date-and-time information. Channel information is information indicating a channel on which content has been broadcast, and date-and-time information is information indicating date and time at which content has been broadcast, that is, specifically, information indicating year, month, day, and time (hour, minute, and second). The shared content obtaining unit 62 obtains shared content from the content server 21. Shared content is content that has been broadcast and specified by a predetermined user to be shared.

The notification unit 63 sends a notification of selecting information for registering shared content or selecting shared content to the broadcast receiving apparatus 14. The determination unit 64 determines a number of publishing requests indicating the number of requests for publishing selecting information for selecting shared content of content and the size of a reference value, or determines whether content has been recorded as shared content or whether a refusal notification has been received from the content server 21. The providing unit 65 issues a request for downloading shared content to the content server 21, and receives the shared content that has been sent. The control unit 66 adds the title of shared content to selecting information or sends the number of publishing requests and the number of distribution requests to the content server 21. The number of distribution requests indicates the number of times distribution of shared content has been requested by individual users.

The count unit 69 counts the number of times content has drawn attention of a user. Specifically, every time content is requested to be published as shared content in selecting information, the number-of-publishing-requests counting unit 67 of the count unit 69 counts the number of publishing requests indicating that number of times. Every time distribution of shared content is requested, the number-of-distribution-requests counting unit 68 counts the number of distribution requests indicating that number of times. The storage unit 70 stores shared content received from the content server 21, and additionally stores selecting information for selecting stored shared content, such as the title.

Figure 4:
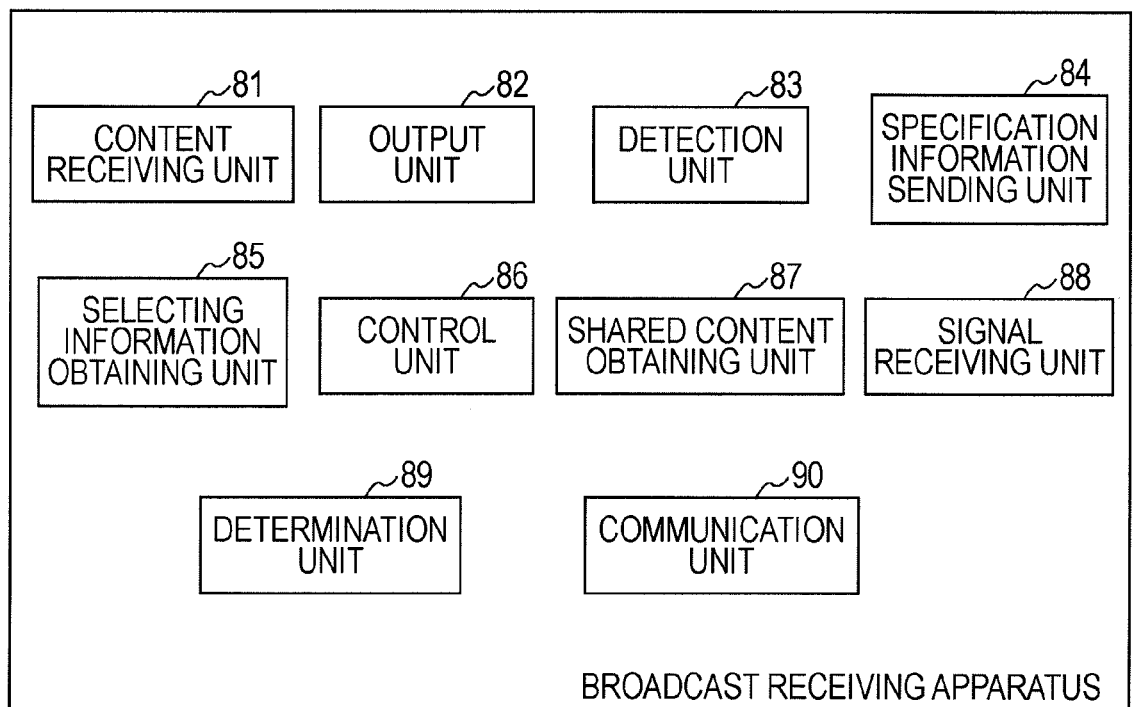
FIG. 4 is a block diagram illustrating a functional structure of an embodiment of a broadcast receiving apparatus.

FIG. 4 is a block diagram illustrating a functional structure of an embodiment of the broadcast receiving apparatus 14. This broadcast receiving apparatus 14 includes a content receiving unit 81, an output unit 82, a detection unit 83, a specification information sending unit 84, a selecting information obtaining unit 85, a control unit 86, a shared content obtaining unit 87, a signal receiving unit 88, a determination unit 89, and a communication unit 90.

The content receiving unit 81 receives a television program that is provided by the sending apparatus 22 as content via the broadcasting network 12. The output unit 82, which is implemented by a CRT (Cathode Ray Tube), an LCD (Liquid Crystal Display), a loudspeaker, or the like, outputs a television program received by the content receiving unit 81 or images and sounds of content obtained by the shared content obtaining unit 87.

The detection unit 83 detects specification information for specifying content that has been received by the content receiving unit 81 and output from the output unit 82 as shared content. For example, channel information and date-and-time information of a television program are detected as specification information. The specification information sending unit 84 sends specification information detected by the detection unit 83 to the video clip server 16. The selecting information obtaining unit 85 obtains selecting information for selecting shared content from the video clip server 16. The control unit 86 displays selection of shared content on the output unit 82. In addition to this, the control unit 86 controls the operation of each unit on the basis of a signal from the signal receiving unit 88. The shared content obtaining unit 87 issues a request for downloading shared content to the video clip server 16, and receives the shared content that has been sent. The signal receiving unit 88 receives an infrared signal output from the remote controller 15, and outputs a correlated signal to the control unit 86.

The determination unit 89 performs a determination process of determining whether or not a notification of registration of shared content has been received. The communication unit 90 sends a notification of the URL (Uniform Resource Locator) of shared content to a different user via the Internet 11. A notification of the URL serving as information indicating the position of shared content or information for accessing shared content can be sent using, for example, email.

Figure 5:
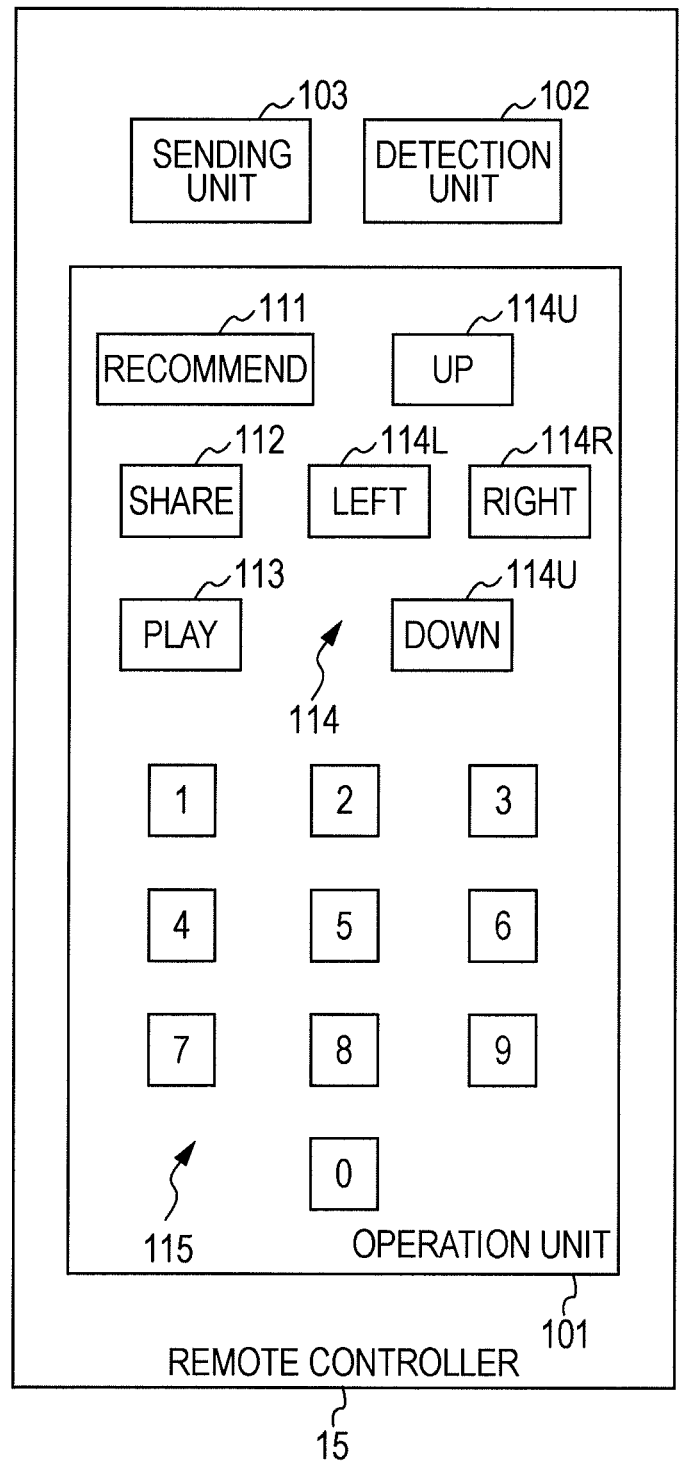
FIG. 5 is a block diagram illustrating a functional structure of an embodiment of a remote controller.

FIG. 5 is a block diagram illustrating a functional structure of an embodiment of the remote controller 15. This remote controller 15 includes an operation unit 101, a detection unit 102, and a sending unit 103.

The operation unit 101 includes various buttons and keys operated by a user. In the case of this embodiment, the operation unit 101 includes a recommendation button 111, a sharing button 112, a play button 113, pointer keys 114, and a numeric keypad 115.

The recommendation button 111 is operated when content viewed by a user is desired to be shared with a different user as shared content. The sharing button 112 is operated to display selecting information for selecting predetermined shared content from among a plurality of shared content items. The play button 113 is operated to start playback of selected shared content. The pointer keys 114 are constituted by an up key 114U, a down key 114D, a left key 114L, and a right key 114R. These are operated to move a pointer that specifies various icons, a display unit, or the like upward, downward, leftward, and rightward. The numeric keypad 115 including keys from numerals 0 to 9 is operated to specify a channel.

The detection unit 102 detects that a button or a key of the operation unit 101 has been operated, and outputs a detection signal thereof to the sending unit 103. The sending unit 103 generates an infrared signal correlated with the detected button or key, and sends the infrared signal to the signal receiving unit 88 of the broadcast receiving apparatus 14.

Figure 6:
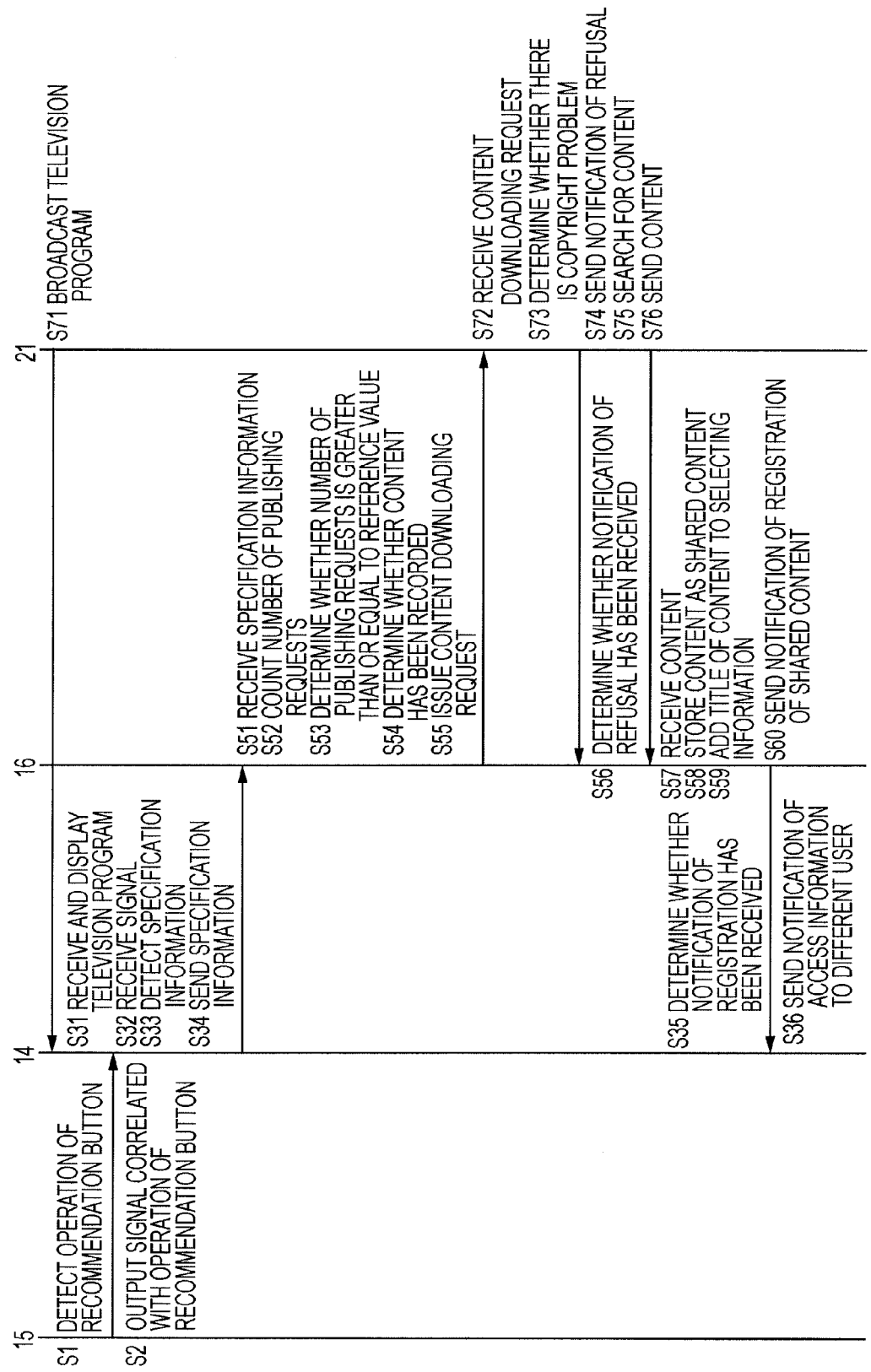
FIG. 6 is a flowchart describing a publishing requesting process.
Figure 7:
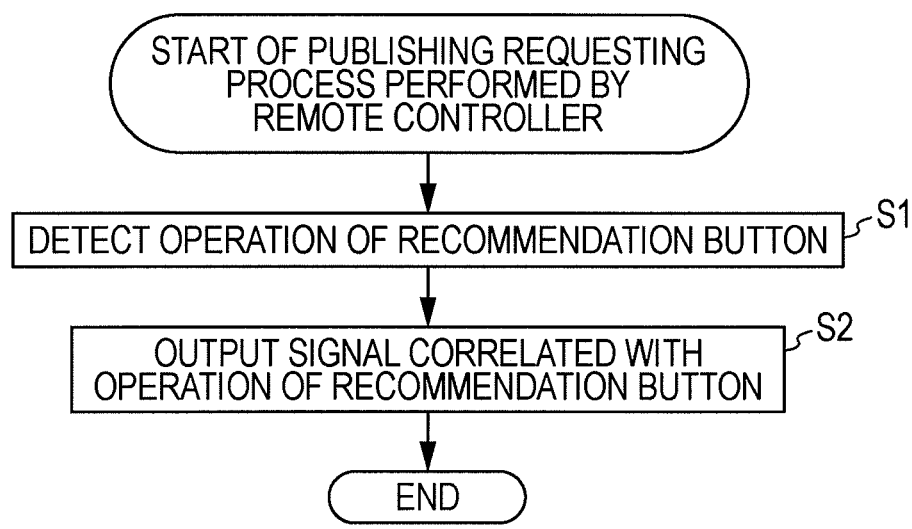
FIG. 7 is a flowchart describing a publishing requesting process performed by the remote controller.
Figure 8:
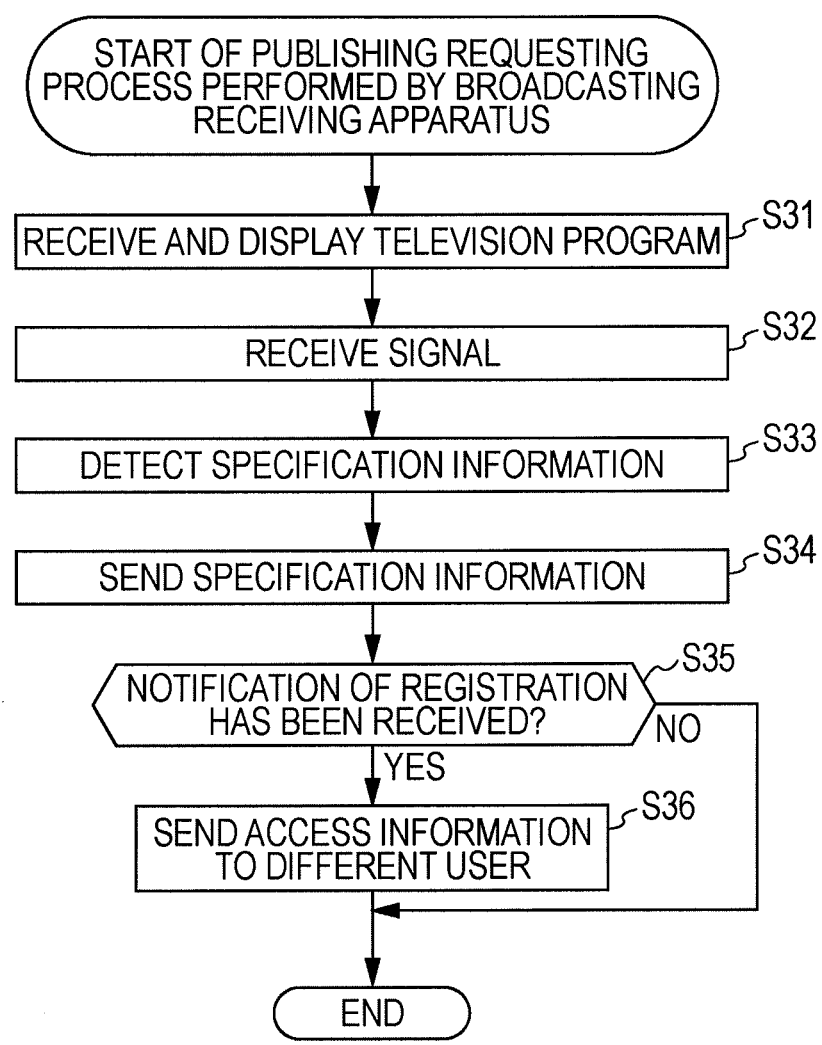
FIG. 8 is a flowchart describing a publishing requesting process performed by the broadcast receiving apparatus.
Figure 9:
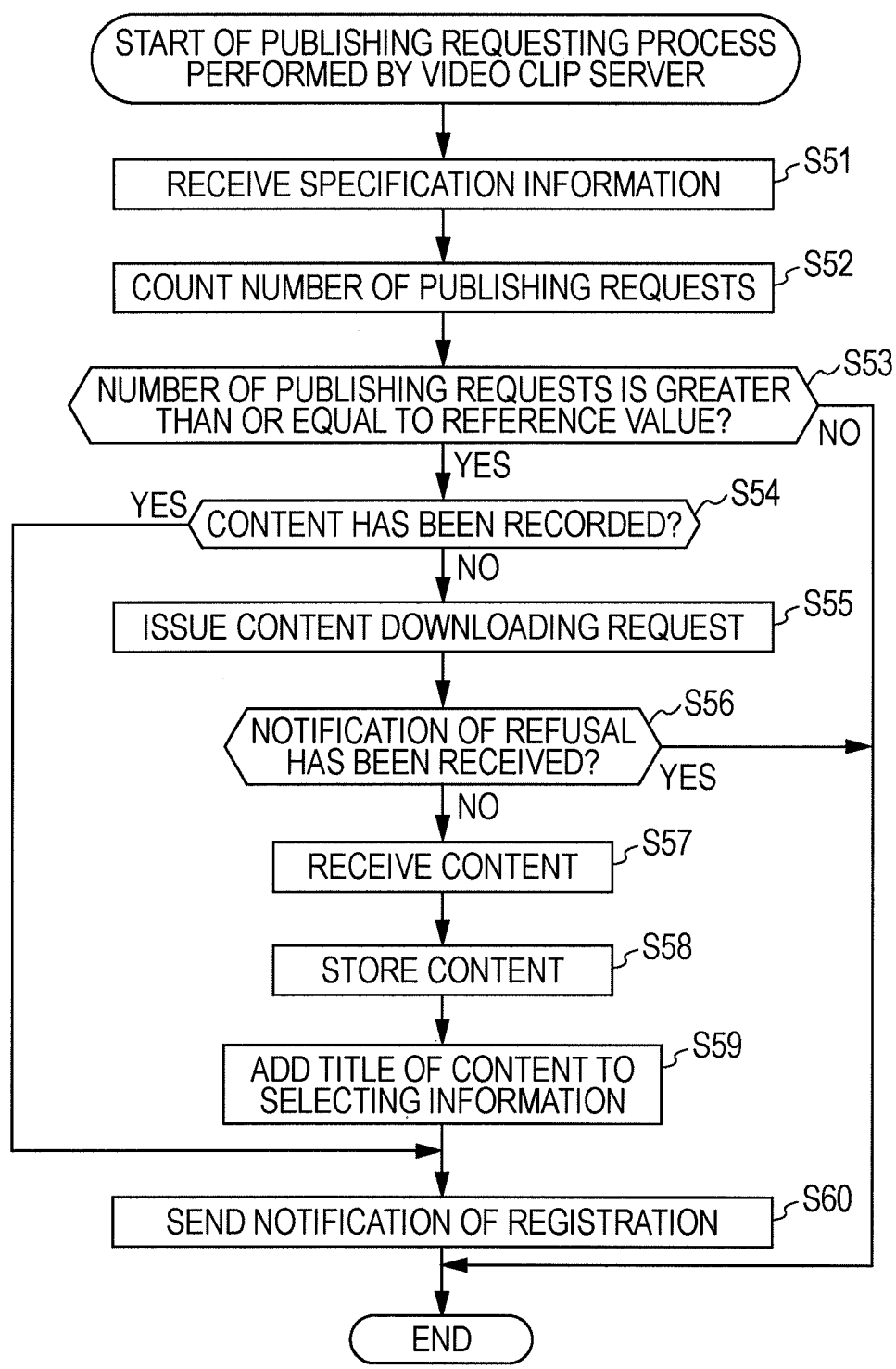
FIG. 9 is a flowchart describing a publishing requesting process performed by the video clip server.
Figure 10:
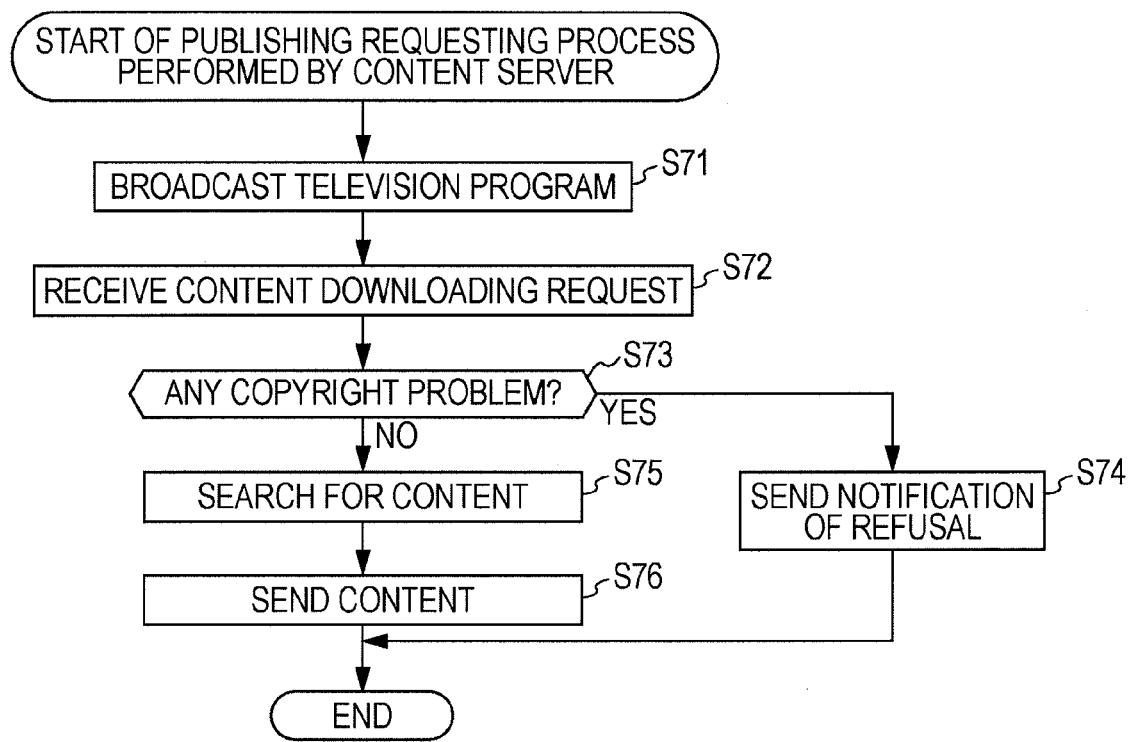
FIG. 10 is a flowchart describing a publishing requesting process performed by the content server.

Next, with reference to FIG. 6 to FIG. 10, a publishing requesting process will be described. Note that FIG. 7 to FIG. 10 illustrate individual processes performed by the remote controller 15, the broadcast receiving apparatus 14, the video clip server 16, and the content server 21, and FIG. 6 illustrates relationships among these processes.

In step S71, the broadcast content supplying unit 41 of the content server 21 broadcasts a television program. That is, content stored in the storage unit 44 is read, and supplied from the sending apparatus 22 to many broadcast receiving apparatuses 14 via the broadcasting network 12.

In step S31, each broadcast receiving apparatus 14 receives a television program that has been broadcast by the content server 21 and that is on a channel specified by a user by operating the numeric keypad 115 of the operation unit 101 of the remote controller 15, and outputs the television program. Specifically, the content receiving unit 81 receives a television program sent from the sending apparatus 22 via the broadcasting network 12. The television program received by the content receiving unit 81 is output to the output unit 82. Accordingly, the user can view the television program serving as content that is currently being received.

When the user wishes to recommend to a different user viewing of the television program (content) the user is viewing, that is, when the user wishes to specify the content the user is currently viewing as shared content to be shared by a plurality of users, the user operates the recommendation button 111 of the remote controller 15. In step S1, the detection unit 102 detects operation of this recommendation button 111. In step S2, the sending unit 103 outputs an infrared signal correlated with the operation of the recommendation button 111.

In step S32, the signal receiving unit 88 receives the infrared signal output from the sending unit 103. A signal correlated with this received signal is supplied to the control unit 86. In step S33, the control unit 86 controls the detection unit 83 to detect specification information for specifying content. Specifically, the detection unit 83 detects, as specification information, channel information and date-and-time information. That is, the broadcast channel the content receiving unit 81 is receiving at that time (e.g., channel 1) and the current time (e.g., 10/12/2006, 18:12:55) are detected as channel information and date-and-time information, respectively. In step S34, the specification information sending unit 84 sends the detected specification information via the Internet 11 to the video clip server 16.

In step S51, the specification information obtaining unit 61 of the video clip server 16 receives the specification information sent from the broadcast receiving apparatus 14. In step S52, since one user has requested to publish one content item as shared content in selecting information, the number-of-publishing-requests counting unit 67 counts the number of publishing requests in order to detect the number of requests for publishing that content. Specifically, the number of publishing requests is incremented by 1.

Next, in step S53, the determination unit 64 determines whether or not the number of publishing requests incremented in step S52 is greater than or equal to a reference value. By setting this reference value to a large value to a certain degree, even when there is a request from a user, if the number of publishing requests, which is the total number of times requests have been issued so far, is less than the reference value, that content is not saved as shared content. In this way, the stored capacity of the storage unit 70 is not unnecessarily increased.

Alternatively, for example, as described above, a large reference value N1 may be set for a publishing request from a user who is a no-charge member. A smaller reference value N2 (N2<N1) may be set for a publishing request from a paid member. Furthermore, the reference value may be zero for a paid user who has paid higher fees. In this way, every content item requested to be published in selecting information may be published (that is, as will be described later, that content may be stored as shared content). In this case, the paid user who has paid higher fees may not only share the shared content with a plurality of users, but also may store content so that the user can view it later. In this way, the user can use the video clip server 16 substantially as his/her own hard disk recorder or video tape recorder, and the user need not independently have such a device.

When it is determined in step S53 that the number of publishing requests is greater than or equal to the reference value, in step S54, the determination unit 64 determines whether or not the content requested to be published has already been recorded as shared content. When the content requested to be published has not been recorded as shared content yet, in step S55, the shared content obtaining unit 62 issues a request for downloading the content to the content server 21. On this occasion, the channel information and the date-and-time information sent from the broadcast receiving apparatus 14 in step S51 are simultaneously sent as specification information for specifying the content. Note that, although a downloading request may be issued each time, a downloading request for a television program may be issued after the broadcast of the television program is completed or after a few hours after the completion of the broadcast. Alternatively, a downloading request for a group of a plurality of content items may be periodically issued, such as every hour or once a day.

When the shared content supplying unit 42 of the content server 21 receives in step S72 the content downloading request from the video clip server 16, the shared content supplying unit 42 specifies, on the basis of the channel information and the date-and-time information serving as the received specification information, content from a program guide stored in advance. Needless to say, content may be specified using an ID such as a CRID as specification information. By using channel information and date-and-time information, not only a digital image, but also an analog image can be easily specified. In step S73, the determination unit 45 determines whether or not there is a copyright problem when the specified content is provided. When there is a copyright problem, such as when no permission to provide the content has been obtained from the copyright holder of the content, in step S74, the notification unit 46 sends a notification of refusal to provide the content.

In contrast, when it is determined in step S73 that there is no copyright problem, the shared content supplying unit 42 sends an instruction to the search unit 43 to search for the specified content. On the basis of the instruction, in step S75, the search unit 43 searches for the specified content among content items stored in the storage unit 44. In step S76, the shared content supplying unit 42 sends the retrieved content to the video clip server 16. On this occasion, the title of that content stored in the storage unit 44 is also retrieved, and the title is sent at the same time.

As above, even when a user watches a television program that is currently being broadcast and specifies this content, this content is sent from the broadcasting apparatus 13 which accumulates this. Thus, instead of from the middle section of the program, the entire content from the beginning is provided to the video clip server 16.

In step S56, the determination unit 64 of the video clip server 16 determines whether or not a notification of refusal has been received from the content server 21. When no refusal notification process has been performed in step S74, the content is sent from the content server 21 by performing the processing in step S76. Therefore, in step S57, the shared content obtaining unit 62 obtains the content sent from the content server 21. In step S58, the storage unit 70 stores the content received in step S57 as shared content. Also, together with the content, the title of the content is sent. In step S59, the control unit 66 adds the title of the content that is just stored in the storage unit 70 to selecting information for selecting the shared content stored in the storage unit 70. The control unit 66 adds access information (e.g., URL) necessary for accessing that content to the selecting information.

After the processing in step S59, in step S60, the notification unit 63 sends a notification of registration of the shared content to the broadcast receiving apparatus 14 which has requested registration of the shared content. This notification includes access information for accessing the content. In the case of this embodiment, a URL is used as access information. Note that the processing in step S60 is also performed when it is determined in step S54 that the content has already been recorded. Thus, the user can be informed of the URL even when the shared content has already been registered by a different user. Needless to say, this notification may include the title of the content.

In step S35, the determination unit 89 determines whether or not a notification of registration of the shared content has been received from the video clip server 16. When a notification of registration has been received, in step S36, the communication unit 90 sends a notification of access information of the shared content to a different user. That is, when the user registers shared content, the user registers in advance a different user (e.g., a friend, a relative, or the like) to whom the user wishes to send a notification of access information thereof. A notification of the access information is sent to the registered different user using, for example, email via the Internet 11. For example, when the user of the broadcast receiving apparatus 14-1 registers shared content, if the user of the broadcast receiving apparatus 14-2 has been registered, a notification of the URL for accessing the shared content and, if necessary, the title thereof is sent to the broadcast receiving apparatus 14-2 via email.

As a result, the user who has received the notification can access, if necessary, the URL serving as the access information (that is, the video clip server 16) and view the shared content introduced by a friend or the like immediately after the registration.

When it is determined in step S53 that the number of publishing requests is not greater than the reference value, and when it is determined in step S56 that a notification of refusal has been received, the specified content will not be sent. Thus, the processing in step S57 to step S60 is skipped.

In the foregoing manner, a television program specified by a user is stored as shared content in the video clip server 16. Content that will cause a copyright problem when provided as shared content is refused to be provided to the video clip server 16. Therefore, only content that causes no copyright problem can be provided as shared content to a user even when the content is analog signal content.

Figure 11:
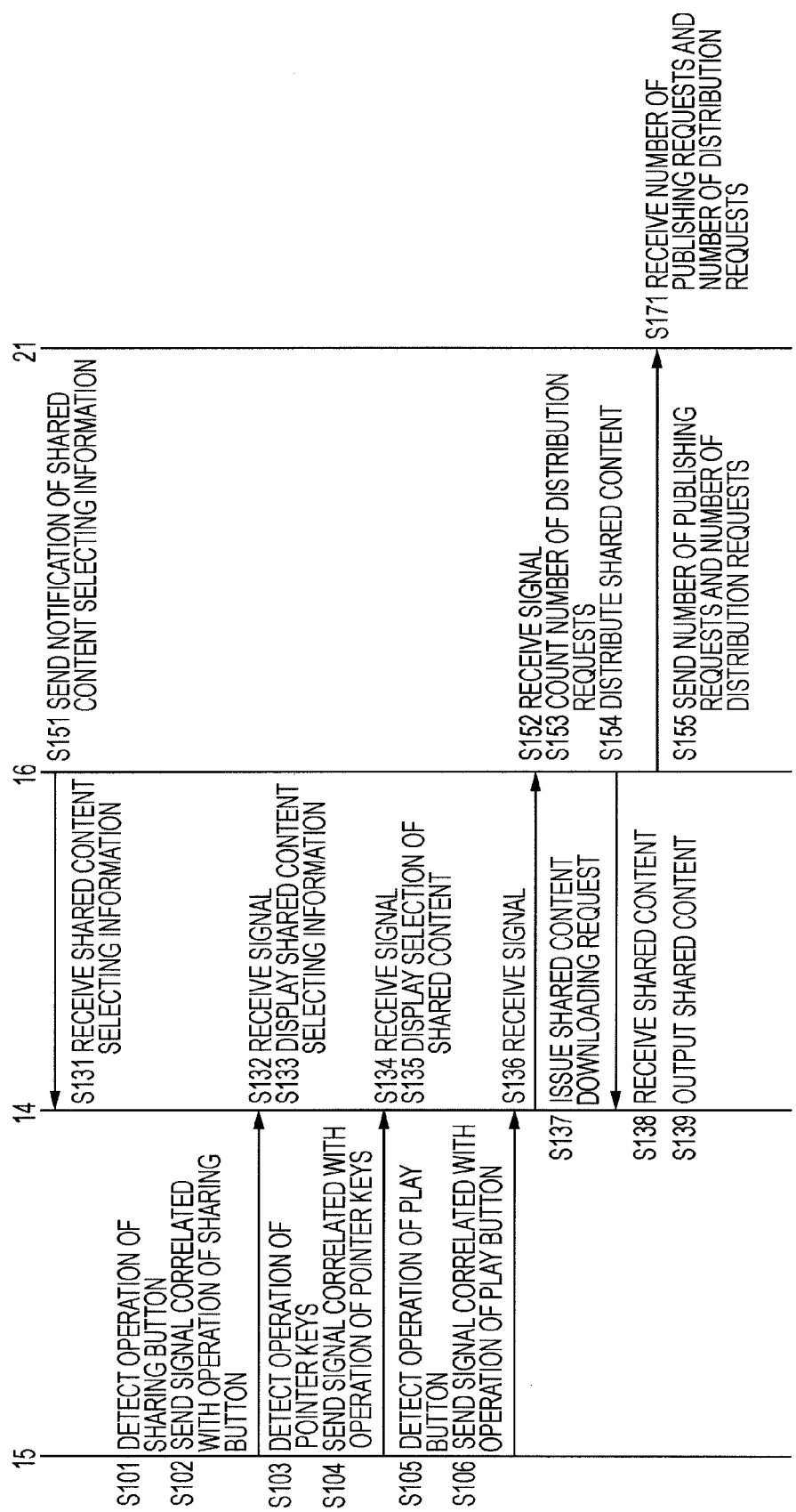
FIG. 11 is a flowchart describing a shared content receiving process.
Figure 12:
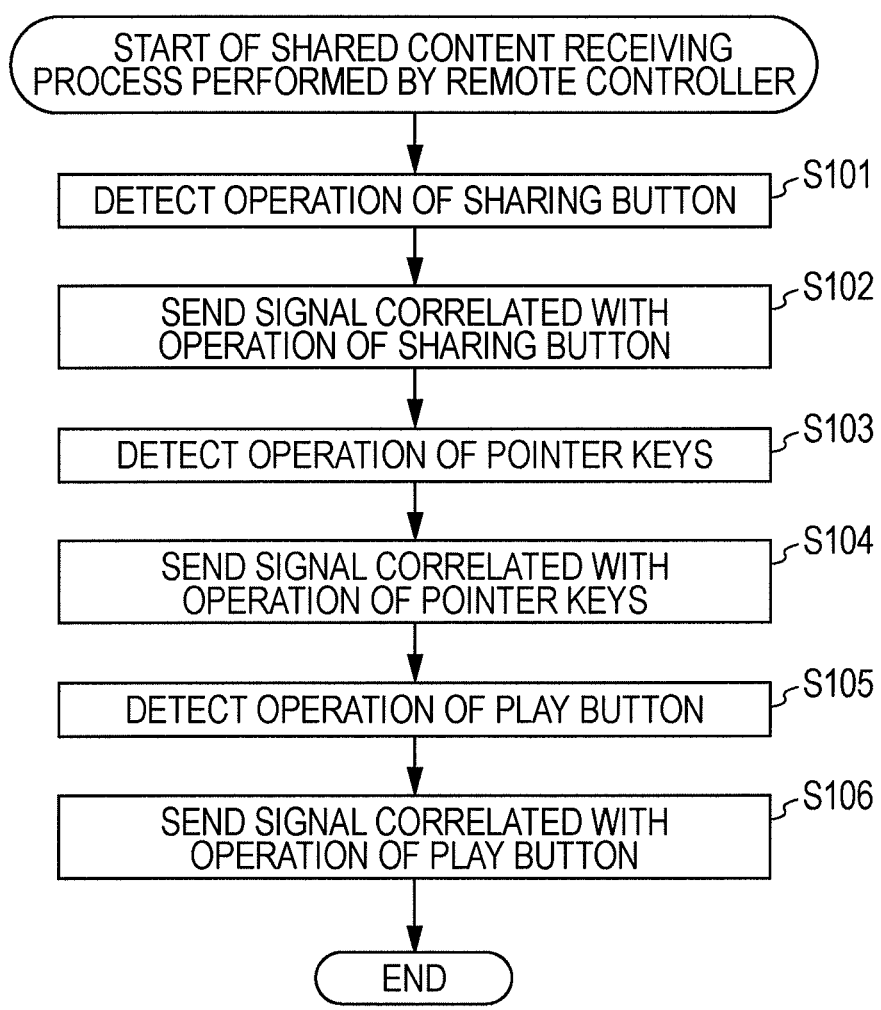
FIG. 12 is a flowchart describing a shared content receiving process performed by the remote controller.
Figure 13:
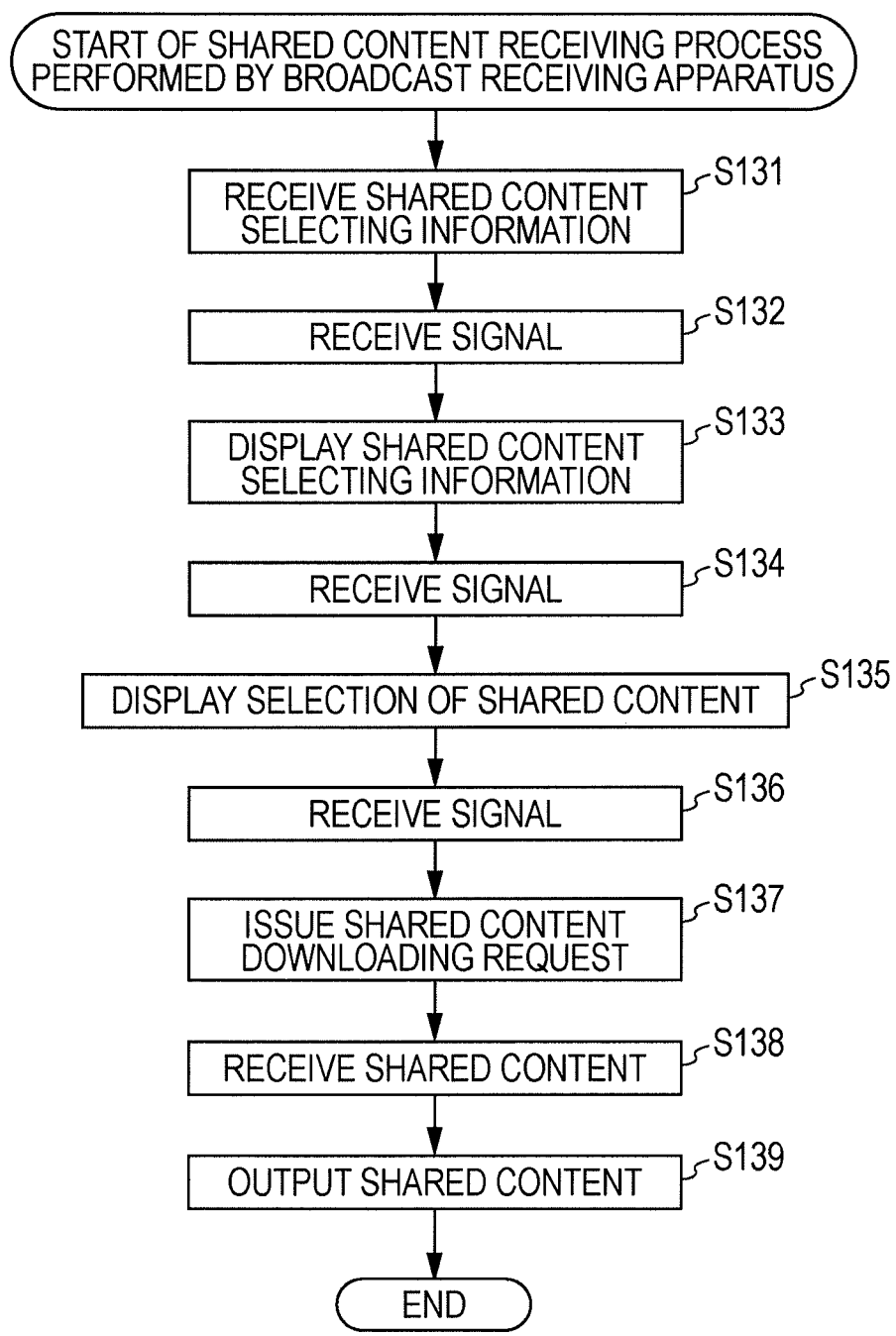
FIG. 13 is a flowchart describing a shared content receiving process performed by the broadcast receiving apparatus.
Figure 14:
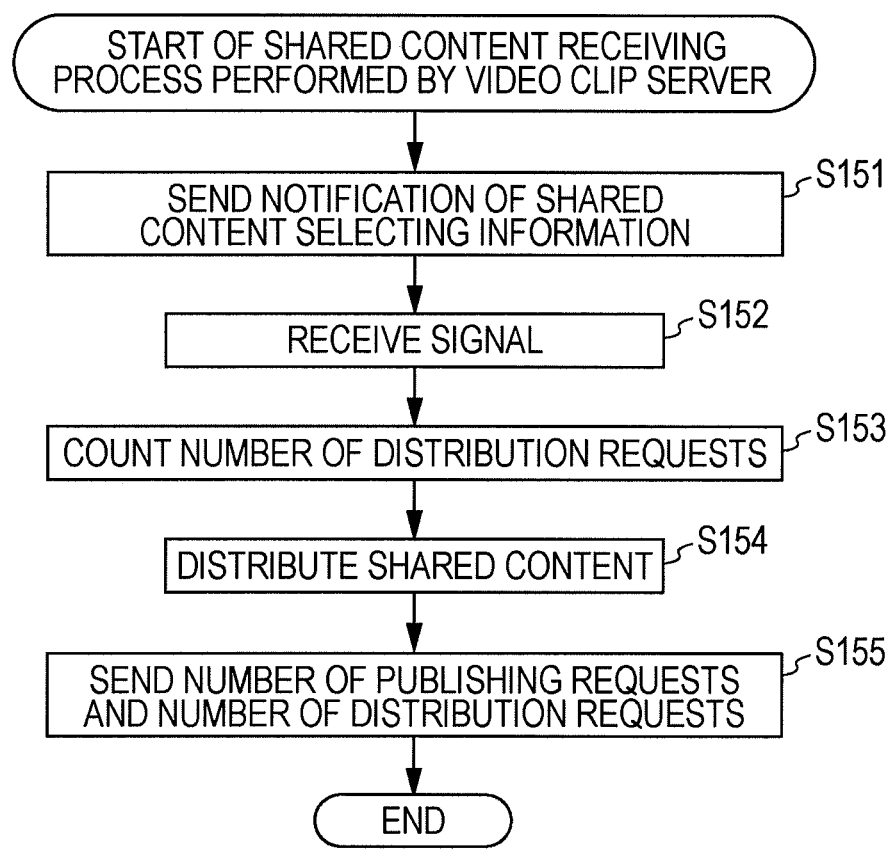
FIG. 14 is a flowchart describing a shared content receiving process performed by the video clip server.
Figure 15:
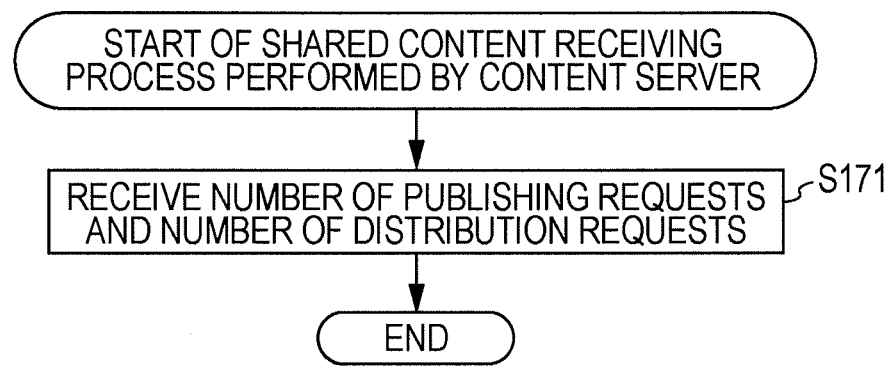
FIG. 15 is a flowchart describing a shared content receiving process performed by the content server.

Next, with reference to FIG. 11 to FIG. 15, a shared content receiving process will be described. Note that FIG. 12 to FIG. 15 illustrate individual processes performed by the remote controller 15, the broadcast receiving apparatus 14, the video clip server 16, and the content server 21, and FIG. 11 illustrates relationships among these processes.

In step S151, the notification unit 63 of the video clip server 16 sends a notification of selecting information for selecting shared content via the Internet 11 to the broadcast receiving apparatus 14 which has been registered in advance. That is, the user of the broadcast receiving apparatus 14 registers itself in advance in the video clip server 16 if the user wishes to receive a notification of selecting information. This notification can be sent using, for example, email. This selecting information is selecting information that is generated in step S59 of FIG. 6 and FIG. 9 by the control unit 66 and stored in the storage unit 70. This selecting information includes a URL for allowing the user to access the shared content, the title for allowing the user to select the shared content, and other information. In the embodiment of FIG. 3, a list of the titles of content T1, T2, T3, . . . and correlated URLs URL1, URL2, URL3, . . . is registered as selecting information. This notification may be periodically sent, such as once a day or once a week. Alternatively, this notification may be sent every time new content is stored.

When the selecting information obtaining unit 85 of the broadcast receiving apparatus 14 receives the selecting information for selecting shared content in step S131, the selecting information obtaining unit 85 stores the selecting information. Accordingly, each broadcast receiving apparatus 14 can have the latest selecting information.

When the user of the broadcast receiving apparatus 14 wishes to view shared content, the user operates the sharing button 112 of the remote controller 15. In step S101, the detection unit 102 detects this operation, and generates a signal correlated with the operation of the sharing button 112. In step S102, the sending unit 103 sends an infrared signal correlated with the operation of the sharing button 112 to the broadcast receiving apparatus 14.

In step S132, the signal receiving unit 88 of the broadcast receiving apparatus 14 receives this infrared signal. When reception of this signal is detected, the control unit 86 controls the selecting information obtaining unit 85 to perform a selecting information obtaining process. That is, in step S133, the selecting information obtaining unit 85 displays the selecting information for selecting shared content, which is stored in the processing in step S131, on the output unit 82. Accordingly, a list of titles and URLs serving as selecting information for selecting content that has been specified as shared content by the user or a different user is displayed. Needless to say, in addition to this, information such as a broadcast channel and broadcast date and time may additionally be displayed as this selecting information. That is, selecting information that is necessary or that serves as a reference for the user to select predetermined shared content is displayed.

The user sees this selecting information and performs an operation to select predetermined content from the selecting information. That is, when the user operates the pointer keys 114 of the remote controller 15 in order to move the pointer upward, downward, leftward, and/or rightward, in step S103, the detection unit 102 detects the operation of the pointer keys 114. In step S104, the sending unit 103 sends an infrared signal correlated with the operation of the pointer keys 114.

When the signal receiving unit 88 of the broadcast receiving apparatus 14 receives the infrared signal in step S134, the signal receiving unit 88 outputs a detection signal thereof to the control unit 86. In step S135, the control unit 86 displays selection of shared content. Specifically, the position of the pointer displayed on the title or URL of shared content displayed on the output unit 82 is moved upward, downward, leftward, and/or rightward in accordance with the operation of the pointer keys 114.

When a state in which the predetermined shared content is selected is reached, the user operates the play button 113. When the detection unit 102 detects the operation of the play button 113 in step S105, in step S106, the sending unit 103 sends an infrared signal correlated with the operation of the play button 113.

In step S136, the signal receiving unit 88 of the broadcast receiving apparatus 14 receives this infrared signal. When this detection signal is received, the control unit 86 controls the shared content obtaining unit 87 to perform a shared content obtaining process. That is, in step S137, the shared content obtaining unit 87 issues, to the video clip server 16 via the Internet 11, a request for downloading or distributing the shared content. A URL or an identification number necessary for accessing the shared content is correlated with the selecting information for selecting the shared content. With the URL or identification number, the shared content is identified.

In step S152, the specification information obtaining unit 61 of the video clip server 16 receives the request from the broadcast receiving apparatus 14 and obtains specification information. In step S153, the number-of-distribution-requests counting unit 68 counts the number of distribution requests. That is, the number of distribution requests indicating the number of times the shared content that is just requested to be distributed is distributed is incremented by 1. In step S154, the providing unit 65 distributes the shared content. That is, the specified content is supplied as shared content via the Internet 11 to the broadcast receiving apparatus 14 which has issued the distribution request.

In step S138, the shared content obtaining unit 87 of the broadcast receiving apparatus 14 receives the shared content sent from the video clip server 16 via the Internet 11. In step S139, the output unit 82 outputs the shared content.

In the foregoing manner, a user can view content specified by a different user as shared content. That is, content can be shared by a plurality of users. Needless to say, each user can view shared content specified by himself/herself.

Further in step S155, the control unit 66 of the video clip server 16 sends the number of publishing requests and the number of distribution requests to the content server 21. In step S171, the shared content supplying unit 42 of the content server 21 receives the number of publishing requests and the number of distribution requests. The number of publishing requests and the number of distribution requests are stored in the storage unit 44. Sending of the number of publishing requests and the number of distribution requests may be performed every time shared content is distributed, or may be periodically performed, such as once a day, a week, or a month.

The number of publishing requests and the number of distribution requests can be evaluated similarly to the rating of a television program. Thus, the manager of the broadcasting apparatus 13 can create a future television program with reference to the number of publishing requests and the number of distribution requests.

Only a very rough statistical result, such as the ratio of viewing households to all households, can be retrieved from a general rating. In contrast, in the case of this embodiment, each user can view certain content at an arbitrary date and time. By investigating the distribution of the numbers of distribution requests in increments of a day, a week, or a month, when the manager wishes to broadcast a similar future program to be viewed in real time, the optimal day of the week, the optimal time, and the like can be investigated.

Figure 16:
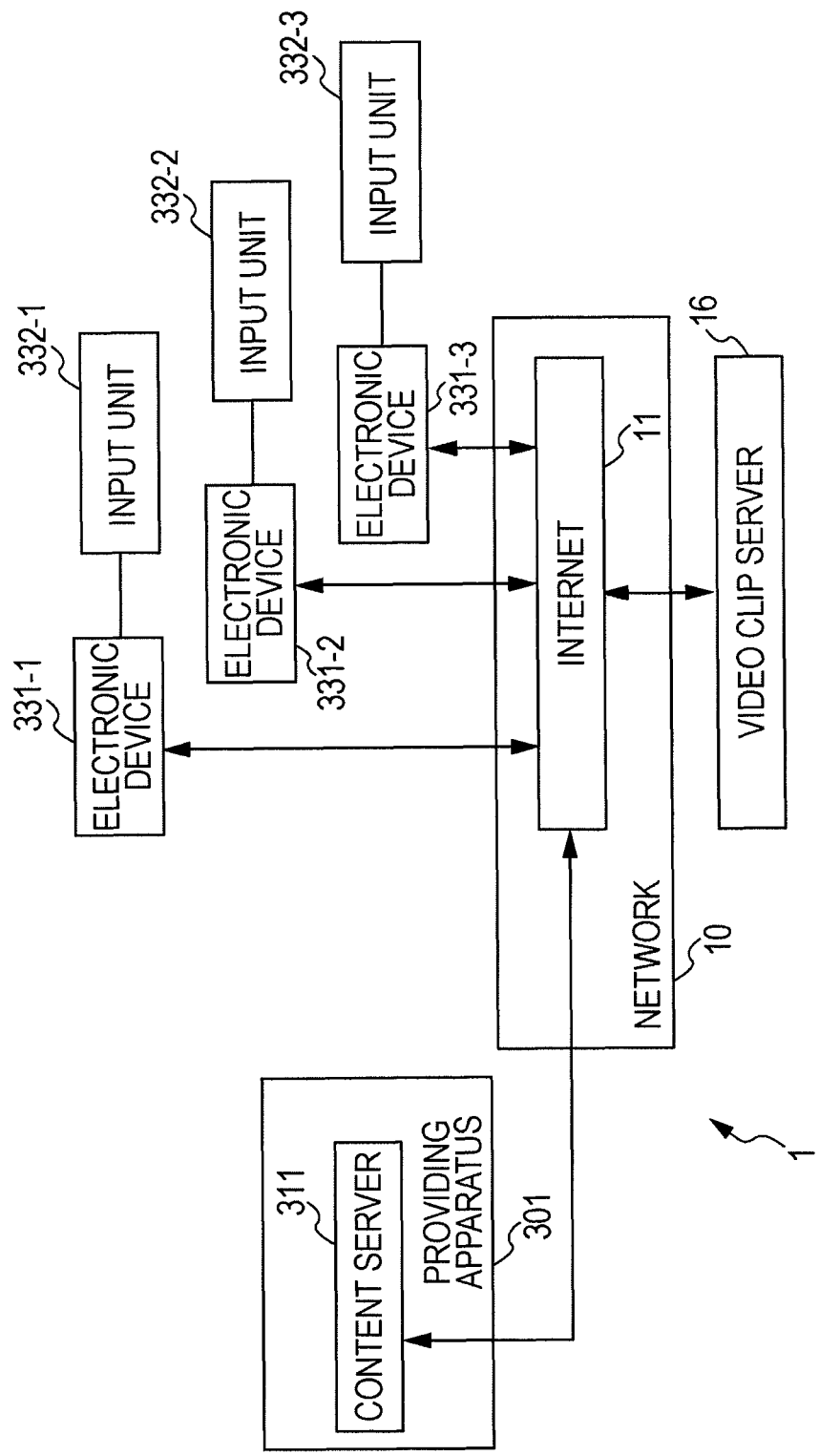
FIG. 16 is a block diagram illustrating a structure of another embodiment of the content providing system to which the present invention is applied.

In the foregoing embodiment, content being broadcast serves as shared content. However, the present invention is also applicable to the case where content provided via the Internet 11 serves as shared content. FIG. 16 is a block diagram illustrating a structure of an embodiment of a content providing system in such a case.

In this content providing system 1, the network 10 is constituted by the Internet 11. The content providing system 1 is constituted by a providing apparatus 301 that provides content via the Internet 11, electronic devices 331-1 to 331-3 that perform various entries using input units 332-1 to 332-3 and obtain content provided from the providing apparatus 301, and the video clip server 16 connected to the providing apparatus 301 and the electronic devices 331-1 to 331-3 via the Internet 11. Although only three input units 332-1 to 332-3 and three electronic devices 331-1 to 331-3 are illustrated, actually there are more input units and electronic devices.

Note that, when it is unnecessary to distinguish the individual input units 332-1 to 332-3 and the individual electronic devices 331-1 to 331-3, they will be simply written as input units 332 or electronic devices 331.

The providing apparatus 301 is constituted by a content server 311. The content server 311 stores content items to be provided to the electronic device 331 that has accessed a portal site thereof via the Internet 11. Among the content items, predetermined content is also supplied as shared content to the video clip server 16 connected via the Internet 11 to the content server 311. The electronic device 331 is constituted by, for example, a personal computer, and the operation of the electronic device 331 is controlled by a correlated one of the input units 332. The input unit 332 is constituted by a keyboard, a mouse, and the like.

Figure 17:
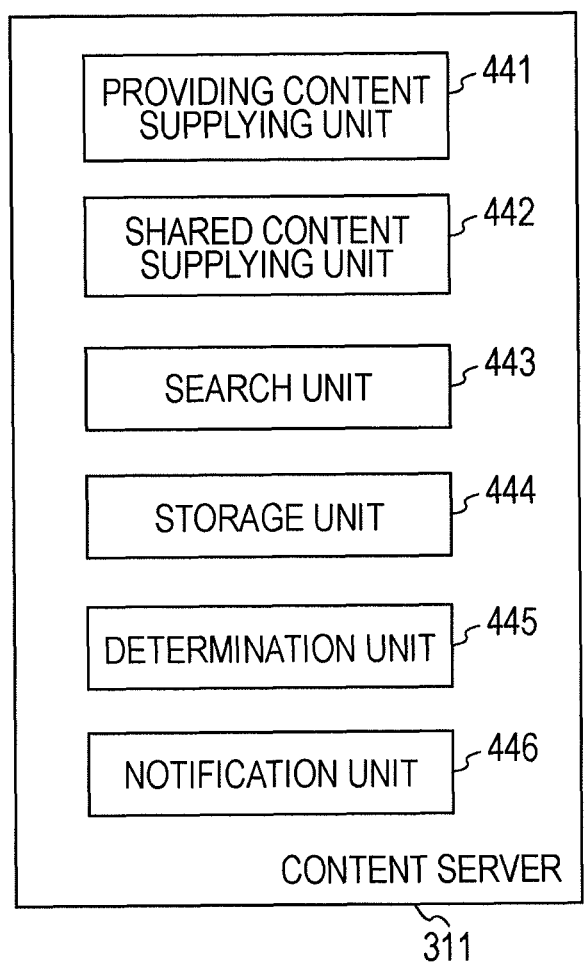
FIG. 17 is a block diagram illustrating a functional structure of an embodiment of the content server in FIG. 16.

FIG. 17 illustrates a functional structure of an embodiment of the content server 311. This content server 311 is constituted by a providing content supplying unit 441, a shared content supplying unit 442, a search unit 443, a storage unit 444, a determination unit 445, and a notification unit 446.

The providing content supplying unit 441 reads content to be provided, which is stored in the storage unit 444, and supplies the content to the electronic device 331 which has accessed the portal site via the Internet 11. The shared content supplying unit 442 outputs, among content items stored in the storage unit 444, content specified as shared content to the video clip server 16 via the Internet 11.

The search unit 443 searches for, among content items stored in the storage unit 444, content requested by a user to be downloaded via the video clip server 16. The storage unit 444 stores content items to be provided. Among the content items, predetermined content also serves as shared content shared by many users. The determination unit 445 determines whether or not there is a copyright problem in distribution of content. The notification unit 446 sends a notification of refusal of provision of content.

The structure of the video clip server 16 in FIG. 16 is constructed as illustrated in FIG. 3, as with the video clip server 16 in FIG. 1. Hereinafter, additionally the video clip server 16 in FIG. 16 will be described with reference to FIG. 3.

Figure 18:
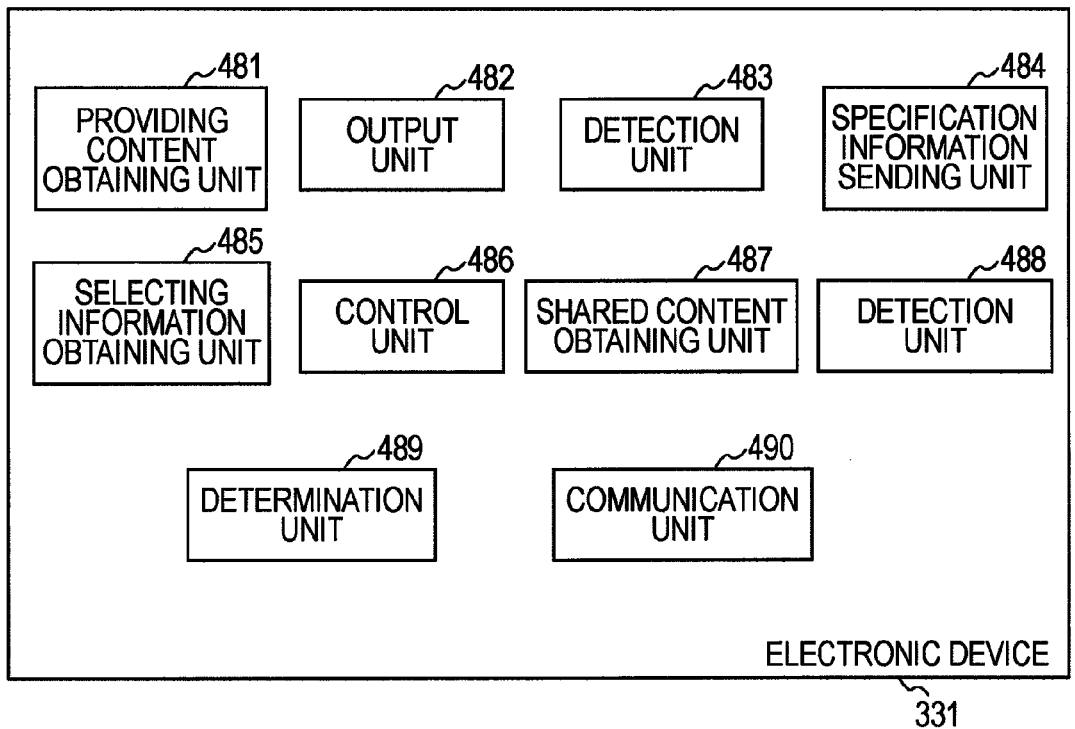
FIG. 18 is a block diagram illustrating a functional structure of an embodiment of an electronic device.

FIG. 18 is a block diagram illustrating a functional structure of an embodiment of the electronic device 331. This electronic device 331 includes a providing content obtaining unit 481, an output unit 482, a detection unit 483, a specification information sending unit 484, a selecting information obtaining unit 485, a control unit 486, a shared content obtaining unit 487, a detection unit 488, a determination unit 489, and a communication unit 490.

The providing content obtaining unit 481 obtains content provided by the content server 311 from a portal site thereof via the Internet 11. The output unit 482 implemented by a CRT, an LCD, or a loudspeaker outputs content obtained by the providing content obtaining unit 481 or shared content obtained by the shared content obtaining unit 487.

The detection unit 483 detects specification information of the content obtained by the providing content obtaining unit 481 and output by the output unit 482. In this embodiment, the URL of the content is detected as the specification information. The specification information sending unit 484 sends the specification information detected by the detection unit 483 to the video clip server 16. The selecting information obtaining unit 485 obtains selecting information for selecting shared content from the video clip server 16. The control unit 486 displays selection of shared content on the output unit 482. In addition to this, the control unit 486 controls the operation of each unit on the basis of a signal from the detection unit 488. The shared content obtaining unit 487 issues a request for downloading shared content to the video clip server 16, and receives the shared content that has been sent.

The detection unit 488 detects various entries from the input unit 332. The determination unit 489 performs a determination process of determining whether or not a notification of registration of shared content has been received. The communication unit 490 performs communication via the Internet 11.

Figure 19:
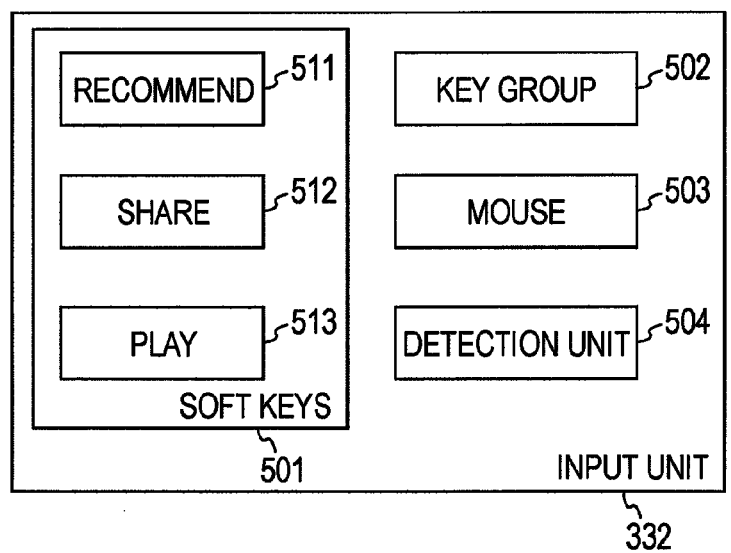
FIG. 19 is a block diagram illustrating a functional structure of an embodiment of an input unit.

FIG. 19 is a block diagram illustrating a functional structure of an embodiment of the input unit 332. This input unit 332 includes soft keys 501, a key group 502, a mouse 503, and a detection unit 504.

The soft keys 501 are keys displayed on a display unit such as an LCD and are operated by clicking with the mouse 503. In the case of this embodiment, the soft keys 501 include a recommendation button 511, a sharing button 512, and a play button 513. In contrast, the key group 502 is constituted by various keys and buttons provided on a keyboard. The soft keys 501 may be constructed by physical keys by assigning functions to predetermined keys among the key group 502.

The recommendation button 511 is operated when content viewed by a user is desired to be shared with a different user as shared content. The sharing button 512 is operated to display selecting information for selecting predetermined shared content from among a plurality of supplied content items. The play button 513 is operated to start playback of selected shared content. The mouse 503 is operated to move a pointer that specifies various icons, a display unit, or the like to an arbitrary position. The detection unit 504 detects the operation of each unit.

Figure 20:
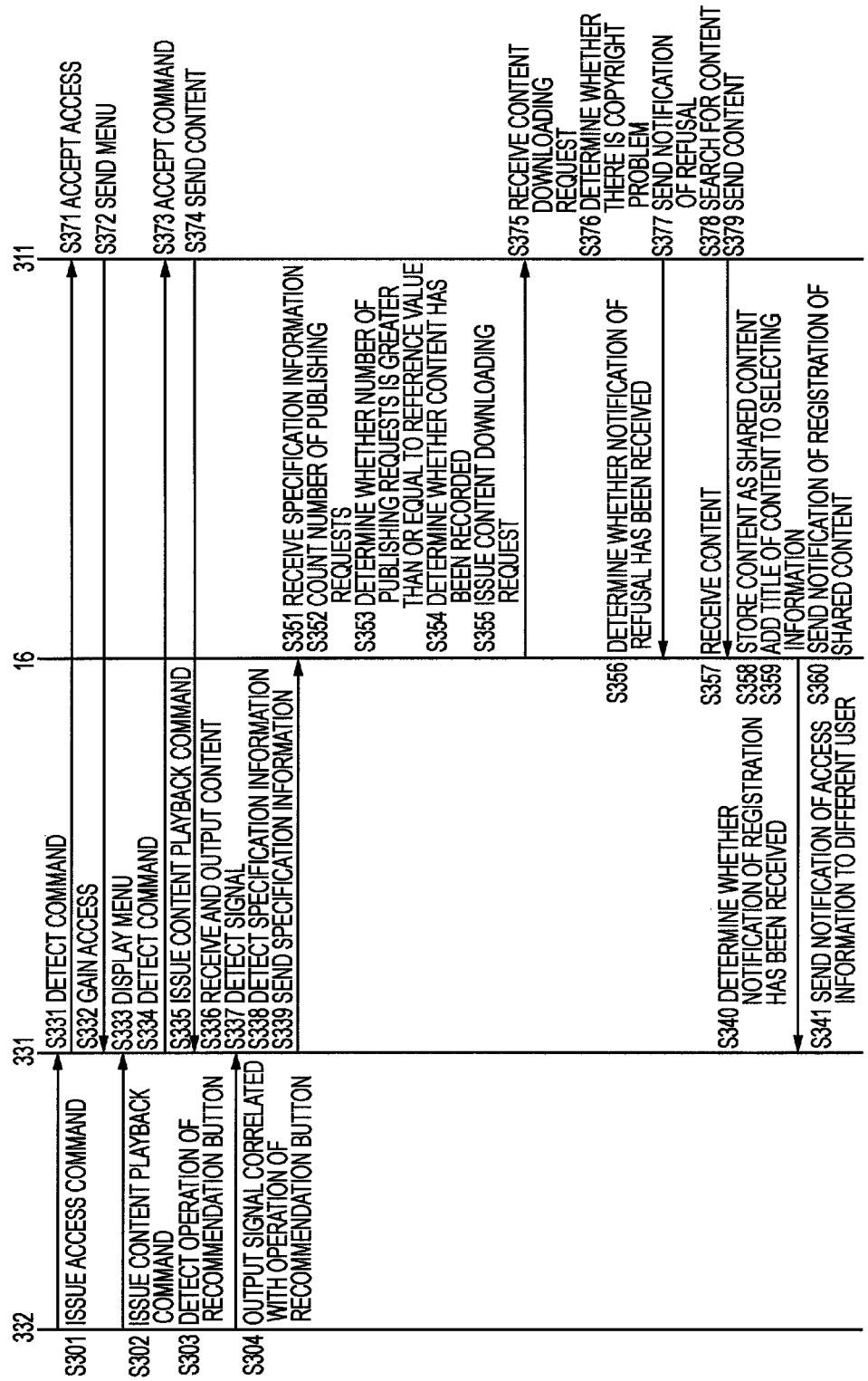
FIG. 20 is a flowchart describing a publishing requesting process performed by the content providing system in FIG. 16.
Figure 21:
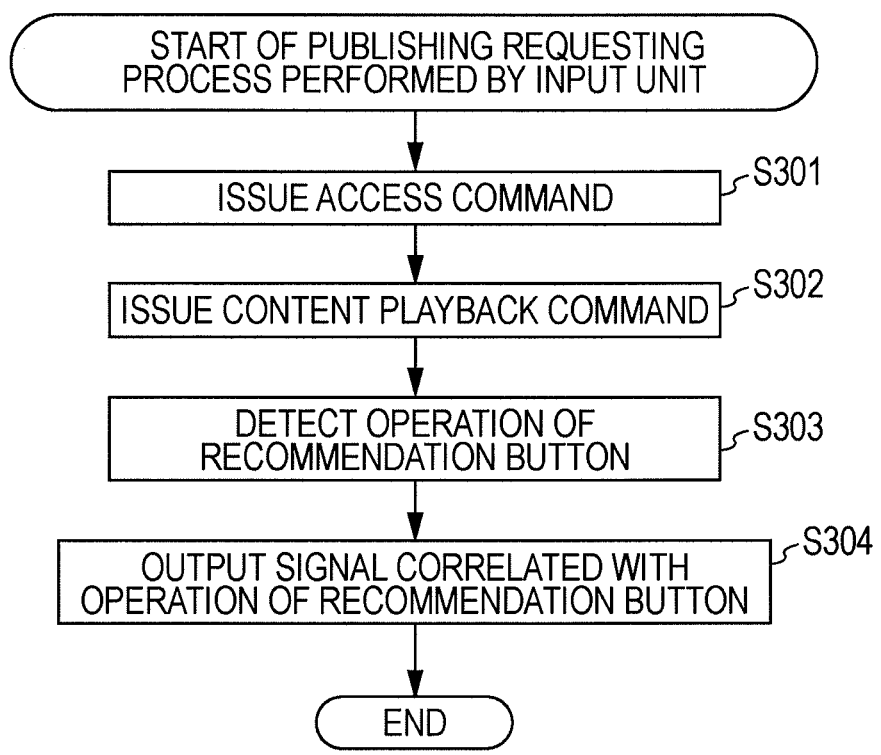
FIG. 21 is a flowchart describing a publishing requesting process performed by the input unit.
Figure 22:
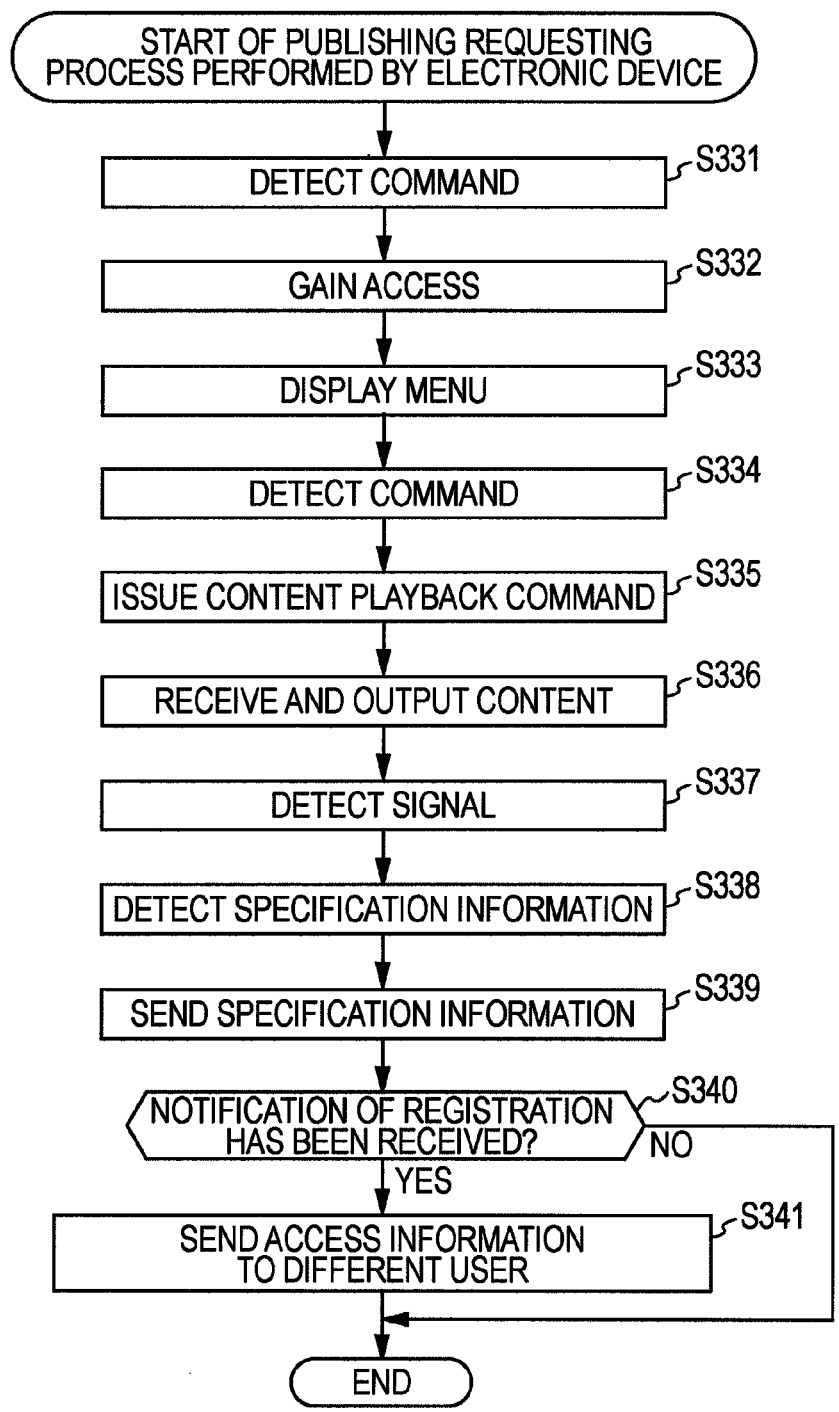
FIG. 22 is a flowchart describing a publishing requesting process performed by the electronic device.
Figure 23:
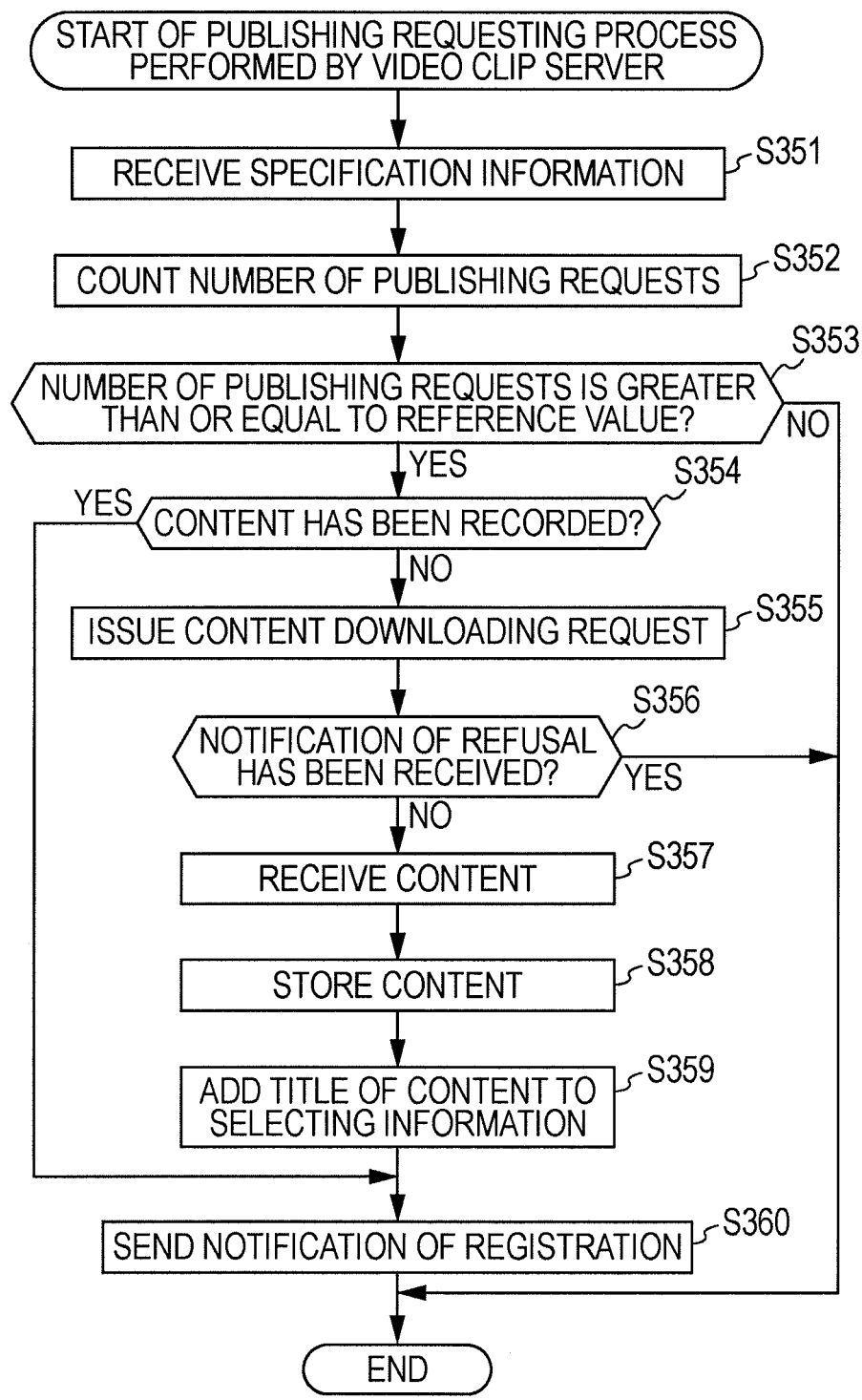
FIG. 23 is a flowchart describing a publishing requesting process performed by the video clip server of the content providing system in FIG. 16.
Figure 24:
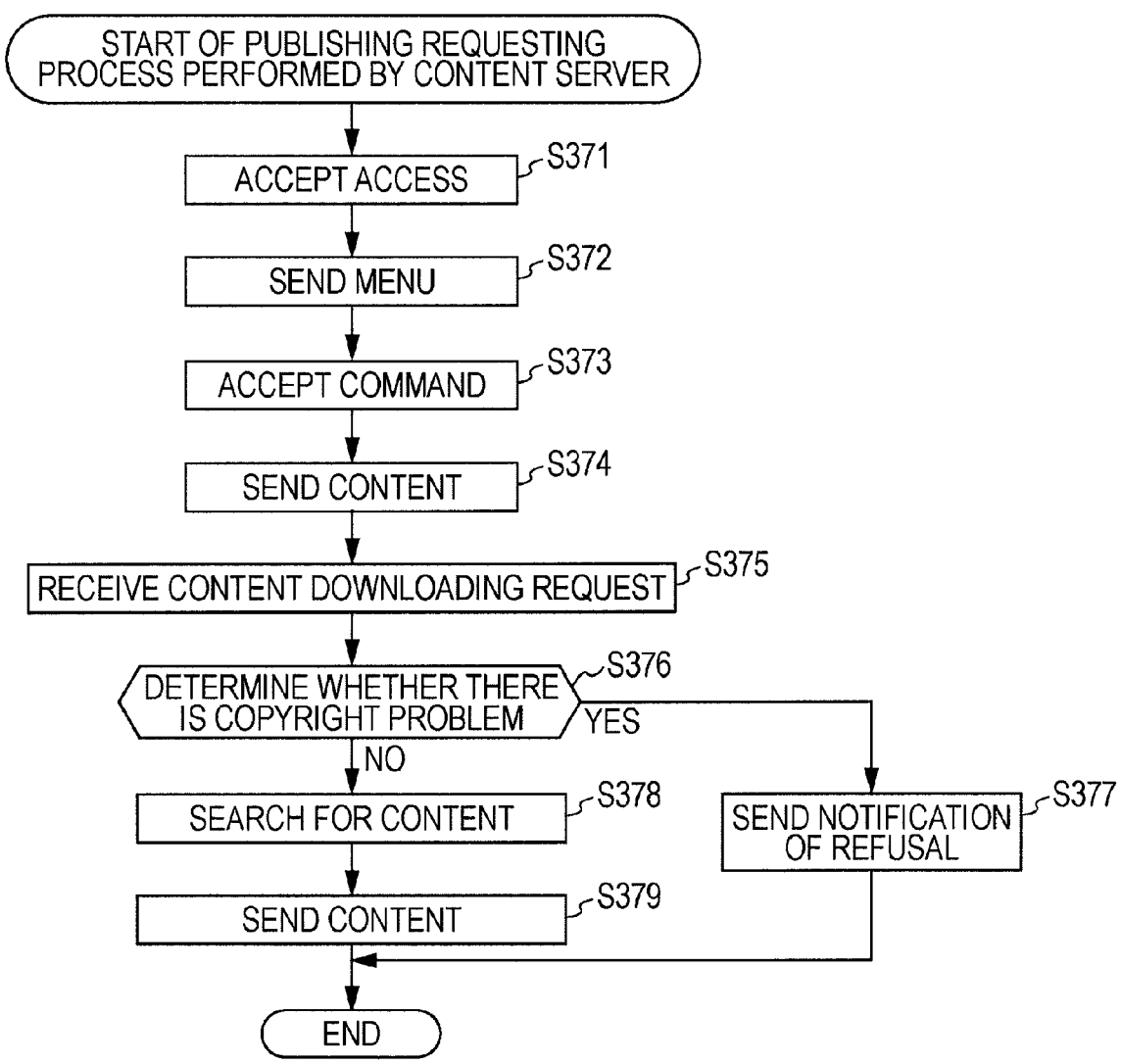
FIG. 24 is a flowchart describing a publishing requesting process performed by the content server of the content providing system in FIG. 16.

Next, with reference to FIG. 20 to FIG. 24, a publishing requesting process will be described. Note that FIG. 21 to FIG. 24 illustrate individual processes performed by the input unit 332, the electronic device 331, the video clip server 16, and the content server 311, and FIG. 20 illustrates relationships among these processes.

When a user wishes to view content provided by the providing apparatus 301, the user operates a predetermined key among the key group 502 of the input unit 332, and issues a command to access a portal site of the video clip server 16. The detection unit 504 detects this operation, and, in step S301, issues an access command correlated with the operation to the electronic device 331.

In step S331, the detection unit 488 of the electronic device 331 detects the command from the input unit 301. In step S332, the providing content obtaining unit 481 accesses the portal site of the content server 311 via the Internet 11.

The providing content supplying unit 441 of the content server 311 accepts access in step S371. In step S372, the providing content supplying unit 441 sends a menu of the portal site for providing content.

In step S333, the providing content obtaining unit 481 of the electronic device 331 displays the menu received from the electronic device 331 on the output unit 482. This menu displays a list of content items. In this list, a representative screen, title, URL, and the like of content are displayed. The user sees the menu, selects content the user wishes to view, and operates the play button 513. In accordance with this operation, in step S302, the detection unit 504 issues a command to play the content to the electronic device 331.

When the providing content obtaining unit 481 of the electronic device 331 detects this command in step S334, in step S335, the providing content obtaining unit 481 issues a command to play the content to the content server 311. Specification information for specifying the content on this occasion is sent to the content server 311. The URL, position data on the list, identification number, or the like is used as the specification information.

When the providing content supplying unit 441 of the content server 311 accepts the command from the electronic device 331 in step S373, in step S374, the providing content supplying unit 441 sends the specified content. That is, the content stored in the storage unit 444 is read, and supplied via the Internet 11 to the electronic device 331 of the user who has gained the access.

In step S336, the providing content obtaining unit 481 of the electronic device 331 receives the content provided from the electronic device 331. The output unit 482 outputs this content. Accordingly, the user can view the specified content.

When the user wishes to recommend to a different user viewing of the content the user is viewing, that is, when the user wishes to specify the content the user is currently viewing as shared content to be shared by a plurality of users, the user operates the recommendation button 511 of the soft keys 501. The detection unit 504 detects the operation of the recommendation button in step S303. In step S304, the detection unit 504 outputs a signal correlated with the operation of the recommendation button.

In step S337, the detection unit 488 of the electronic device 331 detects the signal output from the input unit 332. A signal correlated with this detected signal is supplied to the control unit 486. In step S338, the control unit 486 controls the detection unit 483 to detect specification information. Specifically, the detection unit 483 detects the URL of the content obtained at that time by the providing content obtaining unit 481 and output by the output unit 482. In step S339, the specification information sending unit 484 sends the detected specification information via the Internet 11 to the video clip server 16.

In step S351, the specification information obtaining unit 61 of the video clip server 16 receives the specification information sent from the electronic device 331. In step S352, since one user has requested to publish one content item as shared content in selecting information, the number-of-publishing-requests counting unit 67 counts the number of publishing requests in order to detect the number of requests for that content. Specifically, the number of publishing requests is incremented by 1.

Next, in step S353, the determination unit 64 determines whether or not the number of publishing requests counted in step S352 is greater than or equal to a reference value. The size of the reference value is taken into consideration as is the case with step S53 in FIG. 6 described above.

When it is determined in step S353 that the number of publishing requests is greater than or equal to the reference value, in step S354, the determination unit 64 determines whether or not the content requested to be published has already been recorded as shared content. When the content requested to be published has not been recorded as shared content yet, in step S355, the shared content obtaining unit 62 issues a request for downloading the content to the content server 311. On this occasion, specification information for specifying the content is sent at the same time. For example, the URL received from the electronic device 331 in step S351 serves as the specification information. Note that, although a downloading request may be issued each time, a downloading request for content may be issued after the playback of the content is completed or after a few hours after the completion of the playback. Alternatively, a downloading request for a group of a plurality of content items may be periodically issued, such as every hour or once a day.

When the shared content supplying unit 442 of the content server 311 receives in step S375 the content downloading request from the video clip server 16, the shared content supplying unit 442 specifies pre-stored content on the basis of the received specification information. In step S376, the determination unit 445 determines whether or not there is a copyright problem when the specified content is provided. When there is a copyright problem, such as when no permission of the copyright holder has been obtained, in step S377, the notification unit 446 sends a notification of refusal to provide the content.

In contrast, when it is determined in step S376 that there is no copyright problem, the shared content supplying unit 442 sends an instruction to the search unit 443 to search for the specified content. On the basis of the instruction, in step S378, the search unit 443 searches for the specified content among content items stored in the storage unit 444. In step S379, the shared content supplying unit 442 sends the retrieved content to the video clip server 16. On this occasion, the title of that content stored in the storage unit 444 is retrieved, and the title is sent at the same time.

In step S356, the determination unit 64 of the video clip server 16 determines whether or not a notification of refusal has been received from the content server 311. When no refusal notification process has been performed in step S377, the content is sent from the content server 311 by performing the processing in step S379. Therefore, in step S357, the shared content obtaining unit 62 obtains the content sent from the content server 311. In step S358, the storage unit 70 stores the content received in step S357 as shared content. Also, together with the content, the title of the content is sent. In step S359, the control unit 66 adds the title of the content that is just stored in the storage unit 70 to selecting information for selecting the shared content stored in the storage unit 70.

After the processing in step S359, in step S360, the notification unit 63 sends a notification of registration of the shared content to the electronic device 331 which has requested registration of the shared content. This notification at least includes access information (e.g., URL) necessary for accessing the shared content. Note that the processing in step S360 is also performed when it is determined in step S354 that the content has already been recorded. Thus, the user can be informed of the access information even when the shared content has already been registered by a different user.

In step S340, the determination unit 489 of the electronic device 331 determines whether or not a notification of registration of the shared content has been received from the video clip server 16. When a notification of registration has been received, in step S341, the communication unit 490 sends a notification of the access information to a different user. That is, a notification of the access information is sent to a pre-registered different user such as a friend or a relative using, for example, email via the Internet 11. For example, when the user of the electronic device 331-1 registers shared content, if the user of the electronic device 331-2 has been registered, a notification of the URL serving as the access information for accessing the shared content is sent to the electronic device 331-2 via email.

As a result, the user who has received the notification can access, if necessary, the URL and view the shared content introduced by a friend or the like immediately after the registration.

When it is determined in step S353 that the number of publishing requests is not greater than the reference value, and when it is determined in step S356 that a notification of refusal has been received, the specified content will not be sent. Thus, the processing in step S357 to step S360 is skipped.

In the foregoing manner, content specified by a user is stored as shared content. Content that will cause a copyright problem when provided as shared content is refused to be provided to the video clip server 16. Therefore, only content that causes no copyright problem can be provided as shared content to a user.

Figure 25:
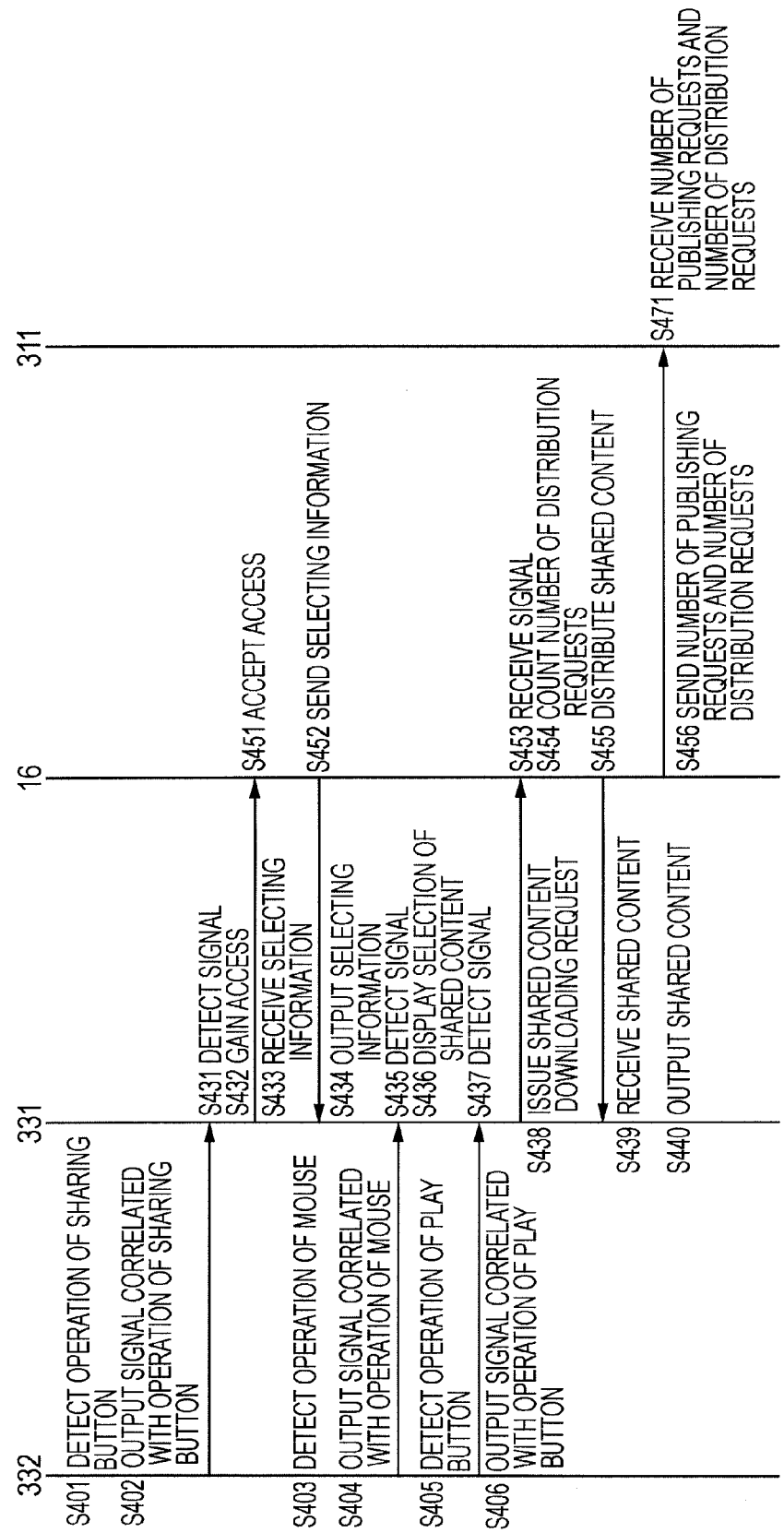
FIG. 25 is a flowchart describing a shared content receiving process performed by the content providing system in FIG. 16.
Figure 26:
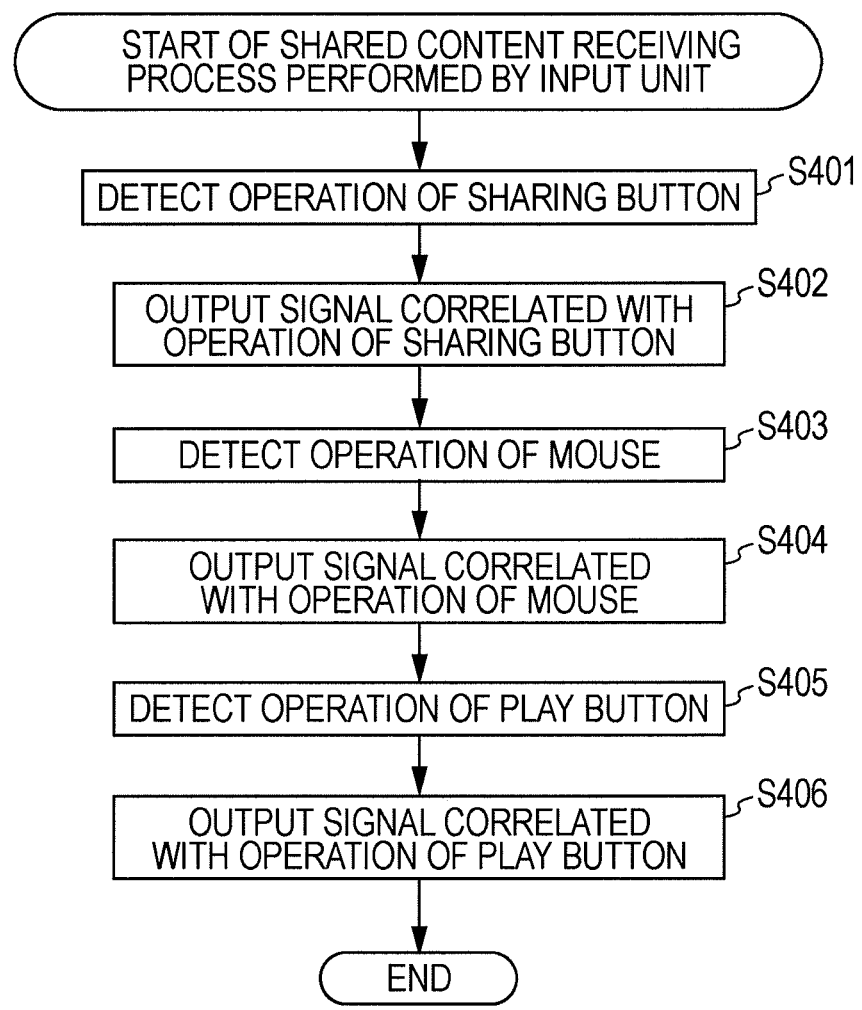
FIG. 26 is a flowchart describing a shared content receiving process performed by the input unit.
Figure 27:
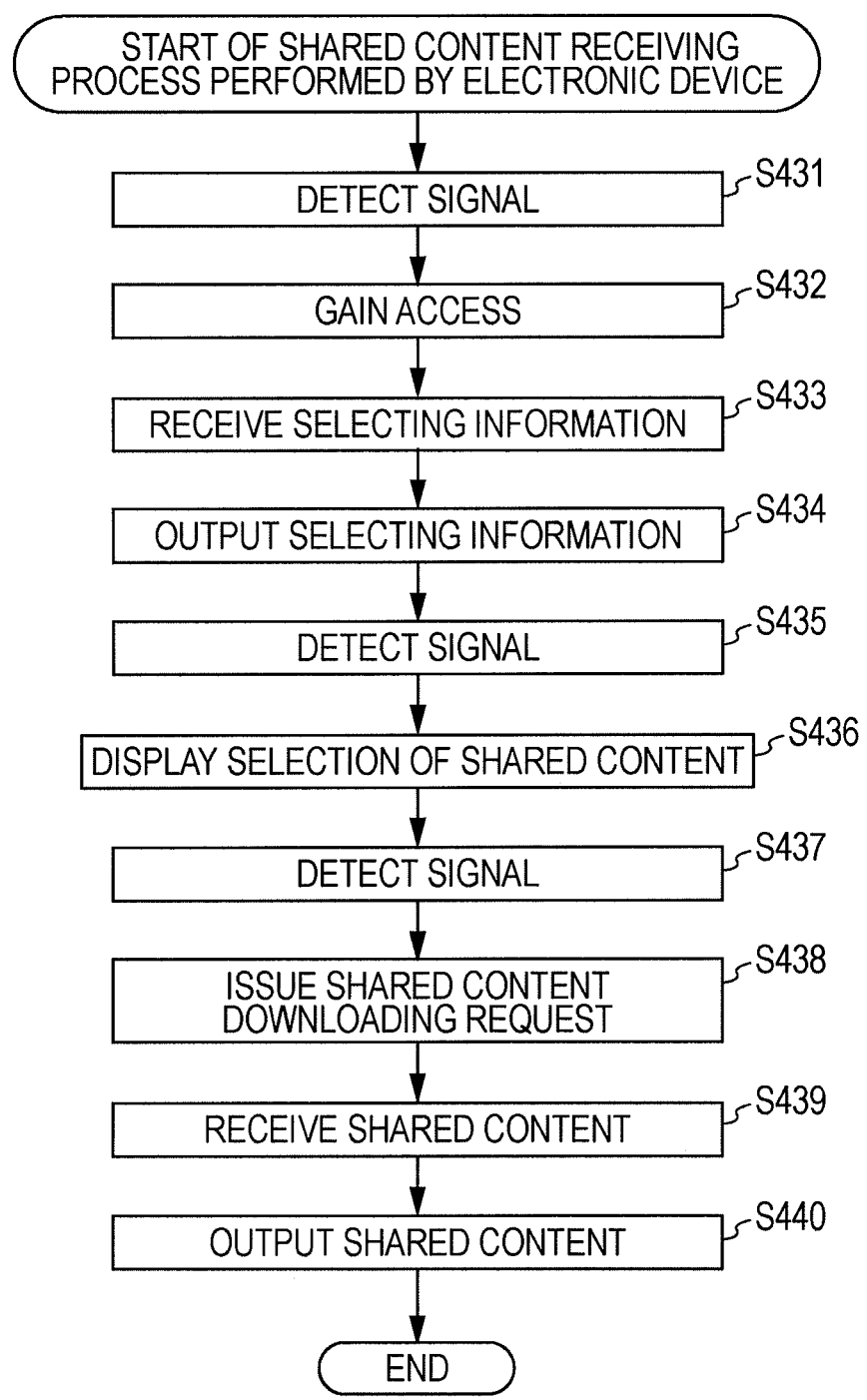
FIG. 27 is a flowchart describing a shared content receiving process performed by the electronic device.
Figure 28:
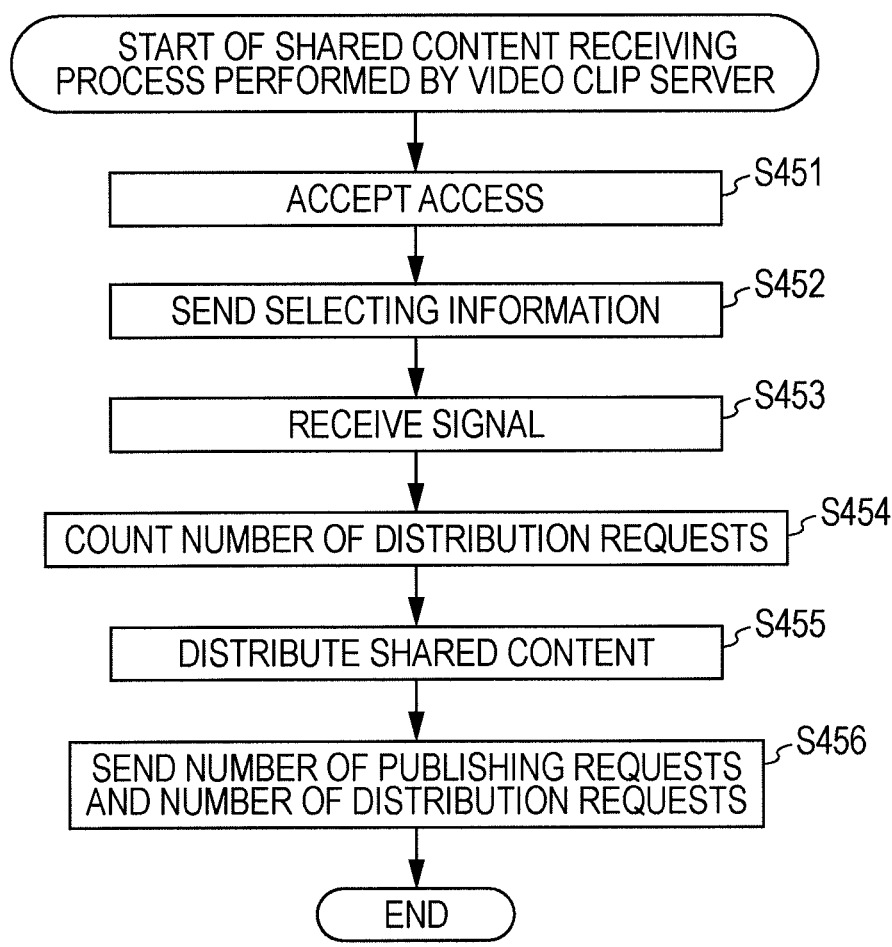
FIG. 28 is a flowchart describing a shared content receiving process performed by the video clip server of the content providing system in FIG. 16.
Figure 29:
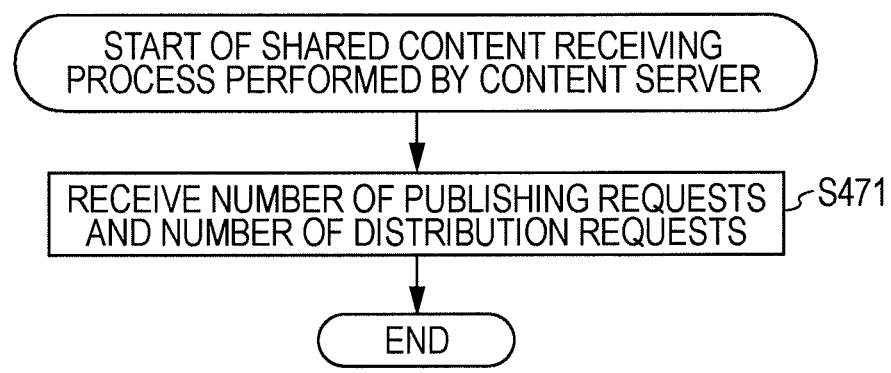
FIG. 29 is a flowchart describing a shared content receiving process performed by the content server of the content providing system in FIG. 16.

Next, with reference to FIG. 25 to FIG. 29, a shared content receiving process correlated with the publishing requesting process in FIG. 20 to FIG. 24 will be described. Note that FIG. 26 to FIG. 29 illustrate individual processes performed by the input unit 332, the electronic device 331, the video clip server 16, and the content server 311, and FIG. 25 illustrates relationships among these processes.

When the user of the electronic device 331 wishes to view shared content, the user operates the sharing button 512 of the input unit 332. The detection unit 504 detects this operation in step S401 and outputs a signal correlated with the operation of the sharing button 512 to the electronic device 331 in step S402.

In step S431, the detection unit 488 of the electronic device 331 detects the signal. In step S432, the shared content obtaining unit 487 accesses the video clip server 16.

In step S451, the providing unit 65 of the video clip server 16 accepts the access from the electronic device 331. In step S452, the notification unit 63 sends selecting information to the electronic device 331 via the Internet 11. The selecting information for selecting shared content is generated by the control unit 66 and stored in the storage unit 70 in step S359 of FIG. 20 and FIG. 23. The selecting information includes a representative screen and a title for the user to select predetermined shared content from a list of shared content items, a URL for accessing the shared content linked thereto, and the like.

In step S433, the selecting information obtaining unit 485 of the electronic device 331 receives the selecting information sent from the video clip server 16. In step S434, the selecting information obtaining unit 485 causes the output unit 482 to output the selecting information obtained in step S433. Accordingly, the selecting information for the content specified by any user as shared content is displayed. Besides the representative screen and the title, the URL may additionally be displayed, or information such as date-and-time information indicating date and time at which the content is recorded as shared content may additionally be displayed as this selecting information.

The user sees this selecting information and performs an operation to select predetermined content from the selecting information. That is, when the user operates the mouse 503 in order to move the pointer to an arbitrary position, in step S403, the detection unit 504 detects the operation of the mouse 503. In step S404, the detection unit 504 sends a signal correlated with the operation of the mouse 503.

When the detection unit 488 of the electronic device 331 receives the signal in step S435, the detection unit 488 outputs a detection signal thereof to the control unit 486. In step S436, the control unit 486 displays selection of shared content. Specifically, the position of the pointer displayed on the title or the like of shared content displayed on the output unit 482 is moved to a position correlated with the operation of the mouse 503.

When a state in which the predetermined shared content is selected is reached, the user operates the play button 513. When the detection unit 504 detects the operation of the play button 513 in step S405, in step S406, the detection unit 504 outputs a signal correlated with the operation of the play button 513.

In step S437, the detection unit 488 of the electronic device 331 detects the signal. On this occasion, the control unit 486 controls the shared content obtaining unit 487 to perform a shared content obtaining process. That is, in step S438, the shared content obtaining unit 487 issues, to the video clip server 16 via the Internet 11, a request for downloading or distributing the shared content. A URL or an identification number serving as specification information for specifying shared content is correlated with the selecting information for selecting shared content. With the URL or identification number, the shared content is identified.

In step S453, the specification information obtaining unit 61 of the video clip server 16 receives the request from the electronic device 331 and obtains the specification information. In step S454, the number-of-distribution-requests counting unit 68 counts the number of distribution requests. That is, the number of distribution requests indicating the number of times the shared content that is just requested to be distributed is distributed is incremented by 1. In step S455, the providing unit 65 distributes the shared content. That is, the specified shared content is supplied via the Internet 11 to the electronic device 331 which has issued the distribution request.

In step S439, the shared content obtaining unit 487 of the electronic device 331 receives the shared content sent from the video clip server 16 via the Internet 11. In step S440, the output unit 482 outputs the shared content.

In the foregoing manner, a user can view content specified by a different user as shared content. That is, content can be shared by a plurality of users. Needless to say, each user can view shared content specified by himself/herself.

Further in step S456, the control unit 66 of the video clip server 16 sends the number of publishing requests and the number of distribution requests to the content server 311. In step S471, the shared content supplying unit 442 of the content server 311 receives the number of publishing requests and the number of distribution requests. The number of publishing requests and the number of distribution requests are stored in the storage unit 444. Sending of the number of publishing requests and the number of distribution requests may be performed every time shared content is distributed, or may be periodically performed, such as once a day, a week, or a month.

The foregoing broadcast receiving apparatus 14 can be constituted by a radio receiver, a mobile phone, a PDA (Personal Digital Assistants), or the like, besides a television receiver. Also, the electronic device 331 can be constituted by a cellular phone, a PDA, or the like, besides a personal computer.

Note that, in this specification, a network is a scheme in which at least two apparatuses are connected, whereby information can be transmitted from one apparatus to another apparatus. Apparatuses that perform communication via a network may be independent apparatuses or internal blocks constituting one apparatus.

Also, communication includes, needless to say, wireless communication and wired communication. Furthermore, communication may be communication including a mixture of wireless communication and wired communication. That is, wireless communication may be performed in one section, and wired communication may be performed in another section. Furthermore, communication from one apparatus to another apparatus may be performed using wired communication, and communication from the other apparatus to one apparatus may be performed using wireless communication.

A series of the foregoing processes may be executed by hardware or software. When the series of processes is to be executed by software, a program constituting the software is installed from a program recording medium into a computer embedded in dedicated hardware or, for example, a general personal computer that can execute various functions by using various programs installed therein.

Note that, in this specification, steps describing the program may include not only processes performed time sequentially in accordance with the order described, but also include processes that are not necessarily executed time sequentially, but are executed in parallel or individually.

Also, a system in this specification represents the entirety of an apparatus constituted by a plurality of apparatuses.

The embodiments of the present invention are not limited to the above-described embodiments, and various modifications can be made without departing from the gist of the present invention.

The invention claimed is:

1. A content providing system comprising:
content providing means for providing content items via a network;
content output means for outputting the provided content items;
specifying/selecting means for specifying, among the output content items output by the content output means, shared content that is content to be shared by a plurality of users and for selecting predetermined shared content;
means for determining a number of times the shared content has been requested to be published by a user; and
shared content providing means for obtaining the specified content as the shared content from the content providing means and for providing the shared content, selected based on selecting information for selecting the obtained shared content, via the network to the content output means which selected the shared content based on the selecting information, the shared content providing means providing the shared content if the number of times the shared content has been requested to be published exceeds a threshold, the selecting information including channel information that the content output means is receiving at that time and current date and time information.

2. The content providing system according to claim 1, wherein the content providing means is constituted by a broadcasting apparatus that broadcasts the content via a broadcasting network serving as the network,
wherein the content output means is constituted by a broadcast receiving apparatus that receives and outputs the broadcast content and displays the selecting information,
wherein the specifying/selecting means is constituted by a remote controller that remotely operates the broadcast receiving apparatus, the remote controller specifying the content output from the broadcast receiving apparatus at a timing at which a predetermined button is operated as the shared content, and selecting the shared content based on the selecting information displayed on the broadcast receiving apparatus, and
wherein the shared content providing means is a server connected to the broadcast receiving apparatus via Internet serving as the network, and the shared content providing means obtains specification information for specifying the content as the shared content from the broadcast receiving apparatus via the Internet, obtains the shared content from the broadcasting apparatus based on the specification information, and sends the selecting information to a plurality of the broadcast receiving apparatuses via the Internet.

3. The content providing system according to claim 1, wherein the content providing means is constituted by a providing apparatus that provides the content via Internet serving as the network,
wherein the content output means is constituted by an electronic device that accepts the provision of the content and outputs the content,
wherein the specifying/selecting means is constituted by an input unit that inputs a command to the electronic device, the input unit specifying the content output from the electronic device at a timing at which a predetermined button is operated as the shared content, and selecting the shared content based on the selecting information displayed on the electronic device, and
wherein the shared content providing means is a server connected to the electronic device via the Internet, and the shared content providing means obtains specification information for specifying the content as the shared content from the electronic device via the Internet, and obtains the shared content from the providing apparatus based on the specification information.

4. A content providing method comprising:
providing content items via a network;
outputting the provided content items;
specifying, among the output content items output by the outputting, shared content that is content to be shared by a plurality of users;
obtaining the content, specified in the specifying, as the shared content from an apparatus that provides the content in the providing;
determining a number of times the shared content has been requested to be published by a user;
selecting predetermined shared content based on selecting information for selecting the obtained shared content, wherein the selecting information including channel information that an apparatus, having selected the shared content, is receiving at that time and current date and time information; and
providing the selected shared content via the network to the apparatus having selected the shared content based on the selecting information, the providing including providing the shared content if the number of times the shared content has been requested to be published exceeds a threshold.

5. A shared content providing apparatus comprising:
specification information obtaining means for obtaining, from a content output apparatus that accepts provision of content items via a network from a content providing apparatus, specification information for specifying a predetermined item among the content items as shared content that is content to be shared by a plurality of users via the network, the specification information including channel information that the content output apparatus is receiving at that time and current date and time information;
shared content obtaining means for obtaining the shared content specified used on the specification information from the content providing apparatus;
means for determining a number of times the shared content has been requested to be published by a user; and
providing means for providing the shared content selected based on selecting information for selecting the obtained shared content to the content output apparatus having selected the shared content based on the selecting information via the network, the providing means providing the shared content if the number of times the shared content has been requested to be published exceeds a threshold.

6. The shared content providing apparatus according to claim 5, further comprising selecting information notification means for sending a notification of the selecting information to the content output apparatus via the network.

7. The shared content providing apparatus according to claim 5, wherein the network via which the content providing apparatus provides the content items is a broadcasting network, the content providing apparatus is a broadcasting apparatus, the network via which the specification information obtaining means obtains the specification information is the Internet, and the content output apparatus is a television receiver.

8. The shared content providing apparatus according to claim 5, further comprising:
counting means for counting the number of times the content has drawn attention; and
sending means for sending the counted number of times to the content providing apparatus.

9. The shared content providing apparatus according to claim 8, wherein the counting means includes
first counting means for counting the number of times the specification information is received; and
second counting means for counting the number of times the shared content is selected based on the selecting information.

10. The shared content providing apparatus according to claim 5, wherein the network via which the content providing apparatus provides the content items and the network via which the specification information obtaining means obtains the specification information are the Internet, and the content output apparatus is a personal computer.

11. A shared content providing method comprising:
obtaining, from a content output apparatus that accepts provision of content items via a network from a content providing apparatus, specification information for specifying a predetermined item among the content items as shared content that is content to be shared by a plurality of users via the network, the specification information including channel information that the content output apparatus is receiving at that time and current date and time information;
obtaining the shared content specified based on the specification information from the content providing apparatus;
determining a number of times the shared content has been requested to be published by a user; and
providing the shared content selected based on selecting information for selecting the obtained shared content to the content output apparatus having selected the shared content based on the selecting information via the network, the providing including providing the shared content if the number of times the shared content has been requested to be published exceeds a threshold.

12. A non-transitory computer readable medium encoded with a program causing a computer to execute a method comprising:
obtaining, from a content output apparatus that accepts provision of content items via a network from a content providing apparatus, specification information for specifying a predetermined item among the content items as shared content that is content to be shared by a plurality of users via the network, the specification information including channel information that the content output apparatus is receiving at that time and current date and time information;
obtaining the shared content specified based on the specification information from the content providing apparatus;
determining a number of times the shared content has been requested to be published by a user; and
providing the shared content selected based on selecting information for selecting the obtained shared content to the content output apparatus having selected the shared content based on the selecting information via the network, the providing including providing the shared content if the number of times the shared content has been requested to be published exceeds a threshold.

13. A content output apparatus comprising:
output means for outputting content items received from a content providing apparatus via a network;
detection means for detecting, when a predetermined item among the output content items is specified as shared content that is to he shared by a plurality of users, specification information for specifying the content, the specification information including channel information that the output means is receiving at that time and current date and time information;
specification information sending means for sending the detected specification information via the network to a shared content providing apparatus;
selecting means for selecting a predetermined item among the shared content based on selecting information for selecting the shared content;
means for determining a number of times the shared content has been requested to be published by a user; and
shared content obtaining means for obtaining the selected shared content from the shared content providing apparatus via the network, the shared content obtaining means obtaining the shared content if the number of times the shared content has been requested to be published exceeds a threshold.

14. The content output apparatus according to claim 13, further comprising selecting information obtaining means for obtaining the selecting information from the shared content providing apparatus via the network.

15. The content output apparatus according to claim 13, wherein the network via which the output means receives the content items from the content providing apparatus is a broadcasting network, the content providing apparatus is a broadcasting apparatus, the network via which the specification information is sent to the shared content providing apparatus is the Internet, the shared content providing apparatus is a server, and the content output apparatus is a television receiver.

16. The content output apparatus according to claim 15, wherein the specification information is channel information indicates a channel that broadcasts the content and the current date-and-time information indicates date and time at which the content is broadcast.

17. The content output apparatus according to claim 13, wherein the network via which, the content providing apparatus provides the content items and the network via which the specification information sending means sends the specification information are the Internet, and the content output apparatus is a personal computer.

18. The content output, apparatus according to claim 17, wherein the specification information includes a URL for accessing the content.

19. A content output method comprising;
outputting content items received from a content providing apparatus via a network;
detecting, when a predetermined item among the output content items is specified as shared content that is to be shared by a plurality of users, specification information for specifying the content, the specification information including channel information that a content output means is receiving at that time and current date and time information;
sending the detected specification information via the network to a shared content providing apparatus;

selecting a predetermined item among the shared content based on the selecting information for selecting the shared content;
determining a number of times the shared content has been requested to be published by a user; and
obtaining the selected shared content from the shared content providing, apparatus via the network, the obtaining including obtaining the shared content if the number of times the shared content has been requested to be published exceeds a threshold.

20. A non-transitory computer readable medium encoded with a program causing a computer to execute a method comprising:
    outputting content items received from a content providing apparatus via a network;
    detecting, when a predetermined item among the output content items is specified as shared content that is to be shared by a plurality of users, specification information for specifying the content, the specification information including channel information that a content output means is receiving at that time and current date and time information;
    sending the detected specification information via the network to a shared content providing apparatus;
    selecting a predetermined item among the shared content based on selecting information for selecting the shared content;
    determining a number of times the shared content has been requested to be published by a user; and
    obtaining the selected shared content from the shared content providing apparatus via the network, the obtaining including obtaining the shared content if the number of times the shared content has been requested to be published exceeds a threshold.

21. The content providing system according to claim 1, wherein the shared content providing means providing the shared content if the number of times the shared content has been requested to be published exceeds a threshold based on the user that requested publication of the shared content.

22. The content providing system according to claim 21, wherein the threshold based on the user that requested publication of the shared content is equal to a first value for a no charge member, the threshold is equal to a second value less than the first value but greater than zero for a paid member, and is equal to zero for a user paying higher fees than the paid member.

* * * * *